(12) United States Patent
Aminaka et al.

(10) Patent No.: US 8,923,871 B2
(45) Date of Patent: Dec. 30, 2014

(54) MOBILE COMMUNICATION SYSTEM, RELAY STATION, BASE STATION, CONTROL METHOD THEREOF, AND COMPUTER READABLE MEDIUM

(75) Inventors: Hiroaki Aminaka, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 440 days.

(21) Appl. No.: 13/445,249

(22) Filed: Apr. 12, 2012

(65) Prior Publication Data

US 2012/0264368 A1 Oct. 18, 2012

(30) Foreign Application Priority Data

Apr. 13, 2011 (JP) .................... 2011-089287

(51) Int. Cl.
*H04W 36/00* (2009.01)
*H04W 40/00* (2009.01)
*H04W 72/04* (2009.01)
*H04B 7/155* (2006.01)
*H04B 7/02* (2006.01)
*H04W 84/04* (2009.01)

(52) U.S. Cl.
CPC ........... *H04B 7/155* (2013.01); *H04W 72/0446* (2013.01); *H04B 7/026* (2013.01); *H04W 84/047* (2013.01)
USPC ........................... 455/444; 455/443; 455/445

(58) Field of Classification Search
CPC ........ H04B 7/026; H04B 7/024; H04B 7/155; H04B 7/15507; H04B 7/15557; H04B 7/15592; H04W 72/0446; H04W 84/047
USPC ....................... 455/73, 42–45, 453
See application file for complete search history.

(56) References Cited

U.S. PATENT DOCUMENTS

| | | | | |
|---|---|---|---|---|
| 2008/0108369 | A1* | 5/2008 | Visotsky et al. | 455/455 |
| 2010/0238854 | A1* | 9/2010 | Kazmi et al. | 370/315 |
| 2012/0170508 | A1* | 7/2012 | Sawai | 370/315 |
| 2013/0039185 | A1* | 2/2013 | Teyeb et al. | 370/235 |
| 2013/0079018 | A1* | 3/2013 | Teyeb et al. | 455/441 |
| 2013/0143574 | A1* | 6/2013 | Teyeb et al. | 455/438 |

OTHER PUBLICATIONS

WO 2011/134555, Teyeb; Oumer, Handover Preparation, Dec. 31, 2010.*
3GPP TR 36.912, V9.2.0. "Feasibility Study for Further Advancements for E-UTRA (LTE-Advanced)", 3GPP (3rd Generation Partnership Project), Mar. 2010, pp. 1-61.
3GPP TR 36.806; V9.0.0 "Relay Architectures for E-UTRA (LTE-Advanced)", 3GPP, Mar. 2010, pp. 1-34.
3GPP TS 36.300, V10.2.0, "Overall Description; Stage 2 (Release 10)", 3GPP, Dec. 2010, pp. 1-200.
3GPP TS 36.814, V9.0.0, "Further Advancements for E-UTRA Physical Layer Aspects", 3GPP, Mar. 2010; pp. 1-104.

* cited by examiner

*Primary Examiner* — Ping Hsieh
*Assistant Examiner* — Xin Jia
(74) *Attorney, Agent, or Firm* — Sughrue Mion, PLLC

(57) ABSTRACT

A mobile communication system includes a base station and a relay station. The relay station acquires a donor cell list indicating at least one candidate cell that can be used for a backhaul link. The relay station or the base station determine a donor cell used for the backhaul link from the donor cell list based on both first and second cell management information. The first cell management information relates to the at least one candidate cell and originates from the at least one base station. The second cell management information originates from the relay station.

46 Claims, 14 Drawing Sheets

MOBILE COMMUNICATION SYSTEM, RELAY STATION, BASE STATION, CONTROL METHOD THEREOF, AND COMPUTER READABLE MEDIUM

CROSS REFERENCE TO RELATED APPLICATION

This application is based upon and claims priority from Japanese patent application No. 2011-089287, filed on Apr. 13, 2011, the disclosure of which is incorporated herein in its entirety by reference.

BACKGROUND

1. Technical Field

Illustrative embodiments relate to a method of selecting a cell to be used for connection between a relay station and a base station from a plurality of candidate cells in a mobile communication system including a base station and a relay station that belongs to the base station.

2. Background

In LTE-Advanced (Long Term Evolution Advanced) of 3GPP (3rd Generation Partnership Project), the introduction of relay stations (hereinafter "RNs (Relay Nodes)") has been examined. Relay stations of LTE-Advanced are shown in 3GPP TR 36.912 V9.2.0 (2010-03), "Feasibility study for Further Advancements for E-UTRA (LTE-Advanced)", and 3GPP TR 36.806 V9.0.0 (2010-03), "Relay architectures for E-UTRA (LTE-Advanced)". The RN is one of techniques for increasing the communication speed of mobile stations (hereinafter "UEs (User Equipments)") located at cell edges and/or for increasing cell areas of base stations (hereinafter "eNBs (Evolved Node Bs)"). The details of the RN architecture examined in 3GPP are shown in 3GPP TR 36.806 V9.0.0 (2010-03).

The outline of a mobile communication system based on the RN architecture disclosed in 3GPP TR 36.806 V9.0.0 (2010-03) is explained hereinafter. FIG. 1 shows a network configuration example when the RN examined in 3GPP is used. A base station (eNB) 91 belongs to a core network (hereinafter "CN") 4 of a mobile telecommunications carrier. The base station (eNB) 91 creates an eNB cell 10 and relays traffic between a mobile station (UE) 3 and the core network (CN) 4. A relay station (RN) 92 belongs to the base station (eNB) 91 by means of a backhaul link (BL1 in the figure) and also belongs to the core network (CN) 4 via the backhaul link (BL1). The base station (eNB) 91 and the relay station (RN) 92 can connect to a management apparatus 5 via the core network (CN) 4. The management apparatus 5 is an OAM (Operation Administration and Maintenance) system, and administers information set by the mobile telecommunications carrier. The relay station (RN) 92 is able to acquire information from the management apparatus 5. The mobile station (UE) 3 belongs to the base station (eNB) 91 or the relay station (RN) 92 by means of an access link (AL1 in the figure). The relay station (RN) 92 creates an RN cell 20 and relays traffic between the mobile station (UE) 3 and the core network (CN) 4. Details of the backhaul link and the access link are explained later.

FIG. 2 is a sequence diagram showing the outline of an RN start-up procedure described in Section 4.7.6 of 3GPP TS 36.300 V10.2.0 (2010-12), "Overall description; Stage 2 (Release 10)". The start-up procedure includes a phase 1 and a phase 2 explained below. In the phase 1, the relay station (RN) 92 connects to a network (E-UTRAN/EPC) as a mobile station (UE). Then, the relay station (RN) 92 acquires initialization parameters from the management apparatus 5 (i.e., OAM system). The initialization parameters include a list (i.e., a donor cell list) of eNB cells to which the relay station (RN) 92 can belong as an RN by using a backhaul link (BL1). After acquiring the initialization parameters, the relay station (RN) 92 releases the network connection as the UE and thereby finishes the phase 1. Note that the base station (eNB) 91-1 to which the relay station (RN) 92 belongs in the phase 1 does not necessarily have the function of allowing a relay station (RN) to belong thereto.

In the phase 2, the relay station (RN) 92 selects one of at least one eNB cell (i.e., candidate for donor cell) indicated by the donor cell list acquired from the management apparatus 5, and belongs to a base station (eNB) 91-2 operating the selected cell as a relay station (RN). Then, the relay station (RN) 92 acquires configuration information of the backhaul link (BL1) from the base station (eNB) 91-2 to which the relay station (RN) 92 belongs, and configures the backhaul link (BL1). After finishing the procedure of the phase 2, the relay station (RN) 92 starts to operate the relay station cell (RN cell) 20.

Further, as disclosed in 3GPP TR 36.814 V9.0.0 (2010-03), "Further advancements for E-UTRA physical layer aspects", there are three types, i.e., type 1, type 1a, and type 1b in the RN examined in 3GPP. The RN may support only one of these three types, or may change the operating mode between plural types. Alternatively, different operating modes may be used for different UEs. The type-1 RN uses the same carrier (i.e., the same frequency) for the backhaul link and the access link (in-band), and time-divides the radio resources for the backhaul link and the radio resources for the access link. The main purpose of this scheme is to avoid the interference from the access-link transmission to the backhaul-link reception in the RN.

The type-1a RN uses different carriers (i.e., different frequencies) for the backhaul link and the access link (out-band). Therefore, the type-1a RN does not require the time-division for radio resources unlike the type-1 RN, and performs mutually independent communications between the backhaul link and the access link.

Similarly to the type-1 RN, the type-1b RN uses the same frequency for the backhaul link and the access link. However, the type-1b RN does not time-divide the radio resources. This type is used on condition that the interference from the access-link transmission to the backhaul-link reception is sufficiently suppressed.

In the phase 2 of the above-described start-up procedure, the RN transmits RN identification information including an RN type to the eNB. Then, the eNB determines the control method of the backhaul link based on the RN type information included in the RN identification information. More specifically, the eNB determines whether the resources of the backhaul link should be time-divided or not based on the RN type information.

In the specification of the present application, among the eNBs, an eNB that can allow an RN to belong thereto is called "Donor eNB" (hereinafter "DeNB"). A mobile station (UE) that directly belongs to a relay station (RN) is called "RN-UE". Further, in the discussion on 3GPP, a demand for supporting multihop RNs in the future is arising. The multihop RN is a technique that makes it possible to connect an additional relay station (RN) to a relay station (RN) that already belongs to an eNB in a cascade configuration. In this specification, in the explanation relating to the multihop technique, a relay station (RN) belonging to an eNB through a radio interface is called "upper RN" and a relay station (RN) belonging to the upper RN through a radio interface is called "lower RN" in order to distinguish them from each other. Further, in this specification, a radio interface between an eNB and an RN and between an upper RN and a lower RN is called "backhaul link". Meanwhile, a radio interface between an eNB and an eNB-UE and between an RN and an RN-UE is called "access link".

The inventors of the present application have made detailed examination on the donor cell selection method that is used when plural candidate donor cells are indicated by the donor cell list. In the above-described procedure disclosed in 3GPP TS 36.300 V10.2.0 (2010-12), the relay station (RN) acquires a donor cell list from a management apparatus such as an OAM system that is different from the base station (eNB). Further, the RN selects a donor cell from the donor cell list based solely on information administered by the RN (e.g., received power measured by the RN) and requests connection with the selected cell. However, the candidate donor cells indicated by the donor cell list, which is supplied from the management apparatus (i.e., OAM system) to the RN, are controlled by eNB(s) based on information administered by the eNB(s) (e.g., the load of the cells and the backhaul link configuration of other RN). Therefore, there is a possibility that a donor cell that is selected based solely on the information administered by the RN (such as received power measured by the RN) is not a desirable cell for the eNB(s) included in the mobile communication system.

For example, assume a case where an eNB generates two cells (first and second cells). When the first and second cells are both indicated by a donor cell list acquired from the management apparatus, the RN selects one of the first and second cells as a donor cell based on the reception quality of the first and second cells measured by the RN itself. In this example, assume that the first cell is selected. Then, the RN requests the eNB that the RN connects to the first cell as an RN. However, there is a possibility that the second cell is more desirable than the first cell as the cell to which the RN newly connects in consideration of the status of the first and second cells at the time when the connection is requested from the RN, i.e., in consideration of the load of the first and second cells, the connection status of other RN, and the like. However, the eNB cannot effectively control the decision on the donor cell that is made by the RN.

As a way of solving this problem, it is conceivable that the eNB (s) waits until the RN requests connection with the most suitable donor cell. Specifically, the eNB (s) may respond with the rejection to the connection request by the RN when the donor cell requested by the RN is not a suitable cell. The RN that receives the rejection response requests connection with a newly-selected donor cell. The eNB (s) repeats the rejection response as long as the donor cell requested by the RN is not a suitable cell, and waits for a connection request for the most suitable donor cell. However, in this method, the rejection response is possibly repeated for many times and therefore a long time is wasted until finding the optimal donor cell. In particular, when the donor cell is switched (backhaul link is switched) after the operation of the RN cell is started, i.e., when the donor cell is switched in a state where an RN-UE already exists, the operation of the RN is temporarily suspended. Therefore, taking a long time for the switching of the donor cell may cause a significant impact on the RN-UE.

Certain embodiments described herein provide a mobile communication system, a relay station, a base station, a control method thereof, and a program, capable of determining a donor cell based on both donor cell selection criteria on a relay station side and donor cell selection criteria on a base station side.

SUMMARY

According to one embodiment, a mobile communication system includes at least one base station and a relay station. The relay station is configured to acquire a donor cell list indicating at least one candidate cell. Further, one of a first base station, included in the at least one base station, and the relay station is configured to determine a donor cell, to be connected to the relay station by the backhaul link, from the donor cell list based on both first cell management information and second cell management information. The first cell management information relates to the at least one candidate cell and originates from the at least one base station. The second cell management information originates from the relay station.

According to another embodiment, a relay station apparatus includes a radio communication unit and a control unit. The radio communication unit is configured to relay transmission and reception data to and from a mobile station by using a backhaul link connected to one of at least one base station and an access link connected to the mobile station. The control unit acquires a donor cell list indicating at least one candidate cell through the radio communication unit. Further, the control unit maintains second cell management information. Further, the control unit determines a donor cell, to be connected to the relay station apparatus by the backhaul link, from the donor cell list in response to receiving first cell management information relating to the at least one candidate cell and originating from the at least one base station.

According to still another embodiment, a base station apparatus includes a radio communication unit and a control unit. The radio communication unit is configured to perform data transfer, through a backhaul link connected to a relay station, with a mobile station connected to the relay station by means of an access link. The control unit maintains or receives, from another base station apparatus, first cell management information. Further, the control unit determines a donor cell, to be connected to the relay station by the backhaul link, from the donor cell list in response to receiving second cell management information from the relay station. The first cell management information relates to the at least one candidate cell.

According to yet another embodiment, a control method of a relay station apparatus includes:
(a) acquiring a donor cell list indicating at least one candidate cell;
(b) maintaining second cell management information; and
(c) determining a donor cell, to be connected to the relay station apparatus by the backhaul link, from the donor cell list in response to receiving first cell management information relating to the at least one candidate cell from the at least one base station.

According to further embodiment, a control method of a base station includes:
(a) maintaining or receives, from another base station apparatus, first cell management information; and
(b) determining a donor cell, to be connected to the relay station by the backhaul link, from the donor cell list in response to receiving second cell management information from the relay station, the first cell management information relating to the at least one candidate cell and originating from at least one base station including the base station apparatus.

According to still further embodiment, a program for causing a computer to carry out the method according to the yet another embodiment is provided.

According to yet further embodiment, a program for causing a computer to carry out the method according to the further embodiment is provided.

According to the above-mentioned embodiments, it is possible to provide a relay station, a base station, a control method thereof, and a program which are capable of determining a donor cell based on both donor cell selection criteria on a relay station side and donor cell selection criteria on a base station side.

ILLUSTRATIVE EMBODIMENTS

Figure 1:
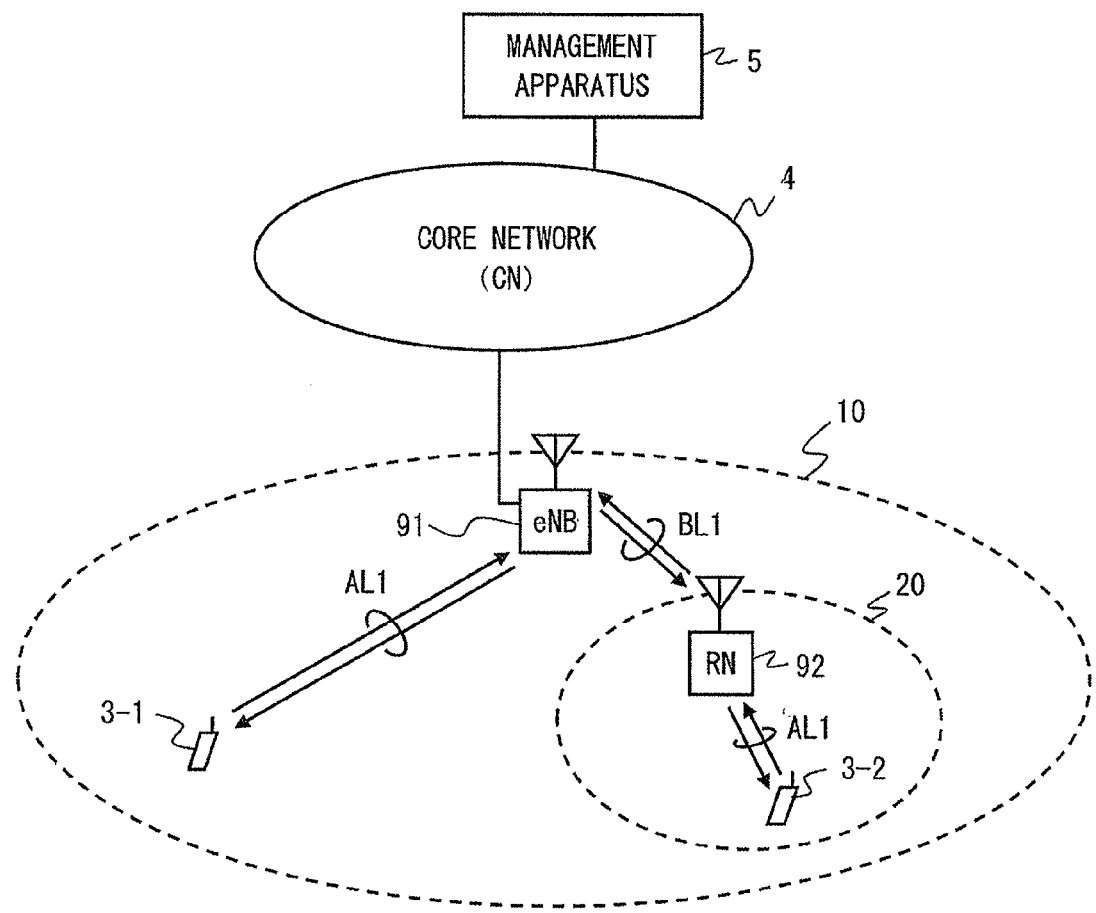
FIG. 1 is a block diagram showing a configuration example of a mobile communication system according to related art.
Figure 2:
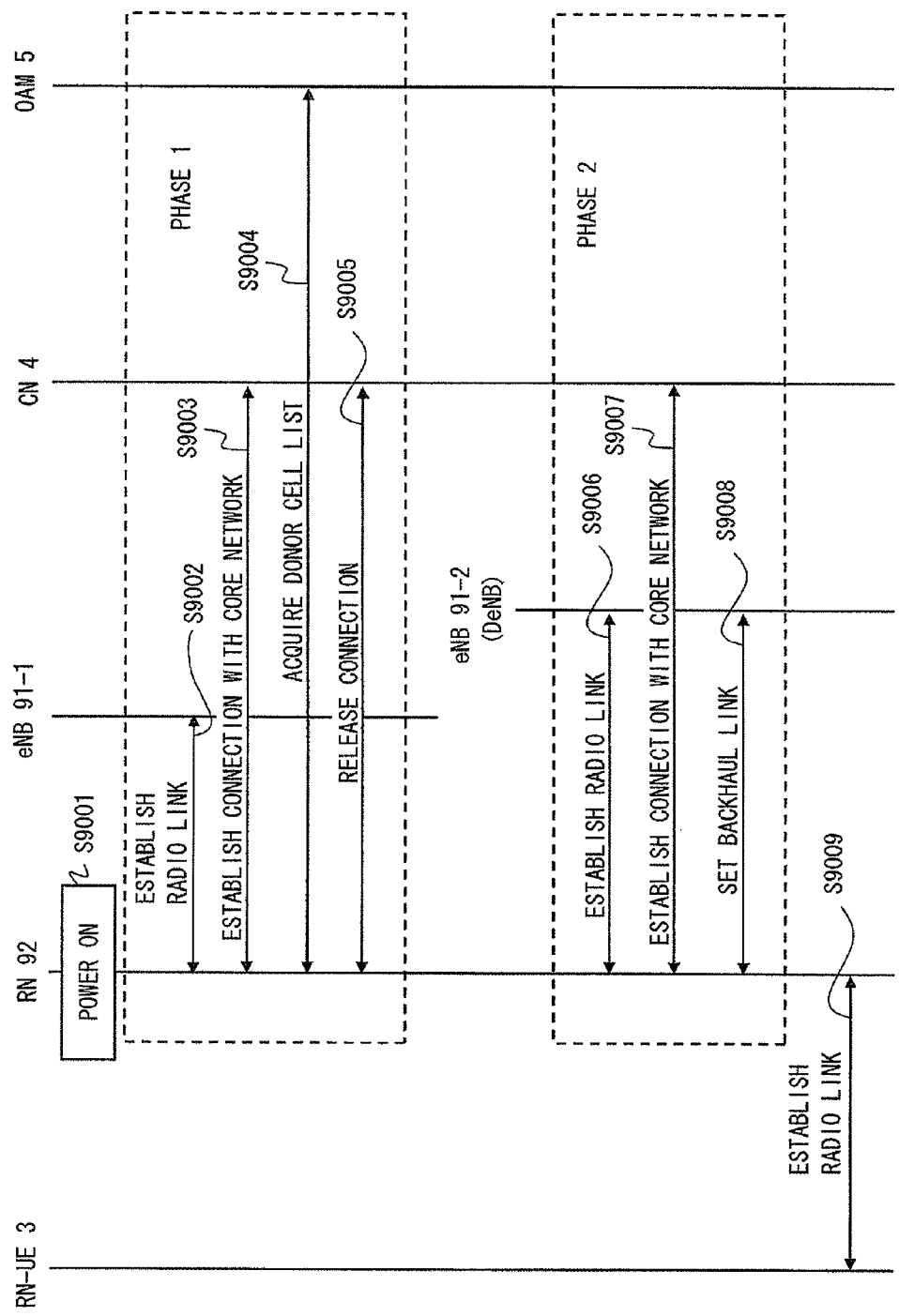
FIG. 2 is a sequence diagram showing a start-up procedure of a relay station according to related art.

Hereinafter, specific embodiments will be described in detail with reference to the drawings. Identical or corresponding elements are designated by identical reference numerals throughout the drawings, and redundant description thereof will be omitted except when necessary.

<First Illustrative Embodiment>

This illustrative embodiment shows an example in which a relay station 2 determines a donor cell from at least one candidate cell indicated by a donor cell list based on first cell management information received from a base station 1 and second cell management information administered by the relay station 2. The first cell management information relates to at least one candidate cell and originates from the base station 1 (or a plurality of base stations 1). In other words, the first cell management information relates to at least one candidate cell and is administered or held by the base station(s) 1. The first cell management information relates to a first parameter(s) that should be taken into account for at least one base station when the donor cell is determined. For example, the first cell management information includes at least one of the following items: the operation status of at least one candidate cell that is taken by the base station(s) 1; and the performance condition of the donor cell requested by the base station(s) 1. More specifically, the first cell management information includes at least one of (1) the load of the at least one candidate cell, (2) the connection status to the at least one candidate cell from another relay station, (3) cell configuration information indicating the time-division implementing status of radio resources of the at least one candidate cell, (4) the priority among the at least one candidate cell held by the base station(s) 1, and (5) a list of cells selected by the base station(s) 1 based on at least one of the aforementioned items (1) to (4). The first cell management information may include information of a cell(s) that is operated by a base station(s) located near or adjacent to the base station(s) 1.

Meanwhile, the second cell management information originates from the relay station 2. In other words, the second cell management information is administered or held by the relay station 2. For example, the second cell management information includes at least one of the following items: the radio quality of at least one candidate cell that is taken by the relay station 2; and the performance condition of the donor cell requested by the relay station 2. More specifically, the second cell management information includes at least one of (a) the reception quality of a down link signal (e.g., downlink received power) from the at least one candidate cell, (b) the type information (e.g., RN-type and Category class) of the relay station 2, (c) the performance of the relay station 2, (d) the priority among the at least one candidate cell held by the relay station 2, and (e) a list of cells selected by the relay station 2 based on at least one of the aforementioned items (a) to (d).

Figure 3:
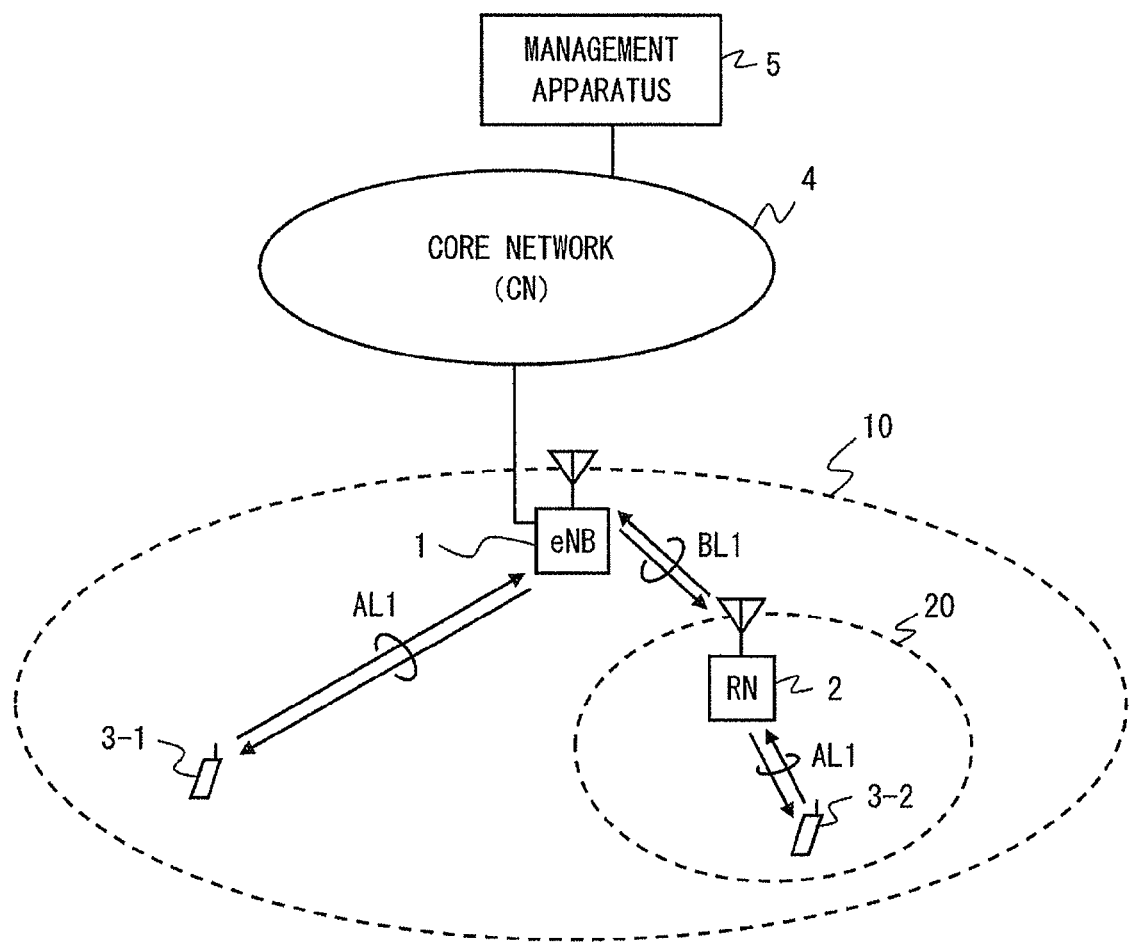
FIG. 3 is a block diagram showing a configuration example of a mobile communication system according to a first illustrative embodiment of the present invention.

A mobile communication system according to this illustrative embodiment is explained on the assumption that the mobile communication system is an FDD (Frequency division Duplex)-OFDMA mobile communication system, more specifically an LTE-Advanced type mobile communication system. FIG. 3 is a block diagram showing a configuration example of a mobile communication system according to this illustrative embodiment. In FIG. 3, the base station (eNB) 1 belongs to a core network (CN) 4 of a mobile telecommunications carrier and relays traffic between a mobile station (UE) 3 and the core network (CN) 4. The base station (eNB) 1 is capable of allowing the relay station 2 to belong thereto (i.e., base station 1 capable of functioning as a DeNB), and is also capable of allowing the mobile station 3 to belong thereto at the same time. The relay station 2 is capable of connecting to the management apparatus 5 through the core network (CN) 4.

Figure 4:
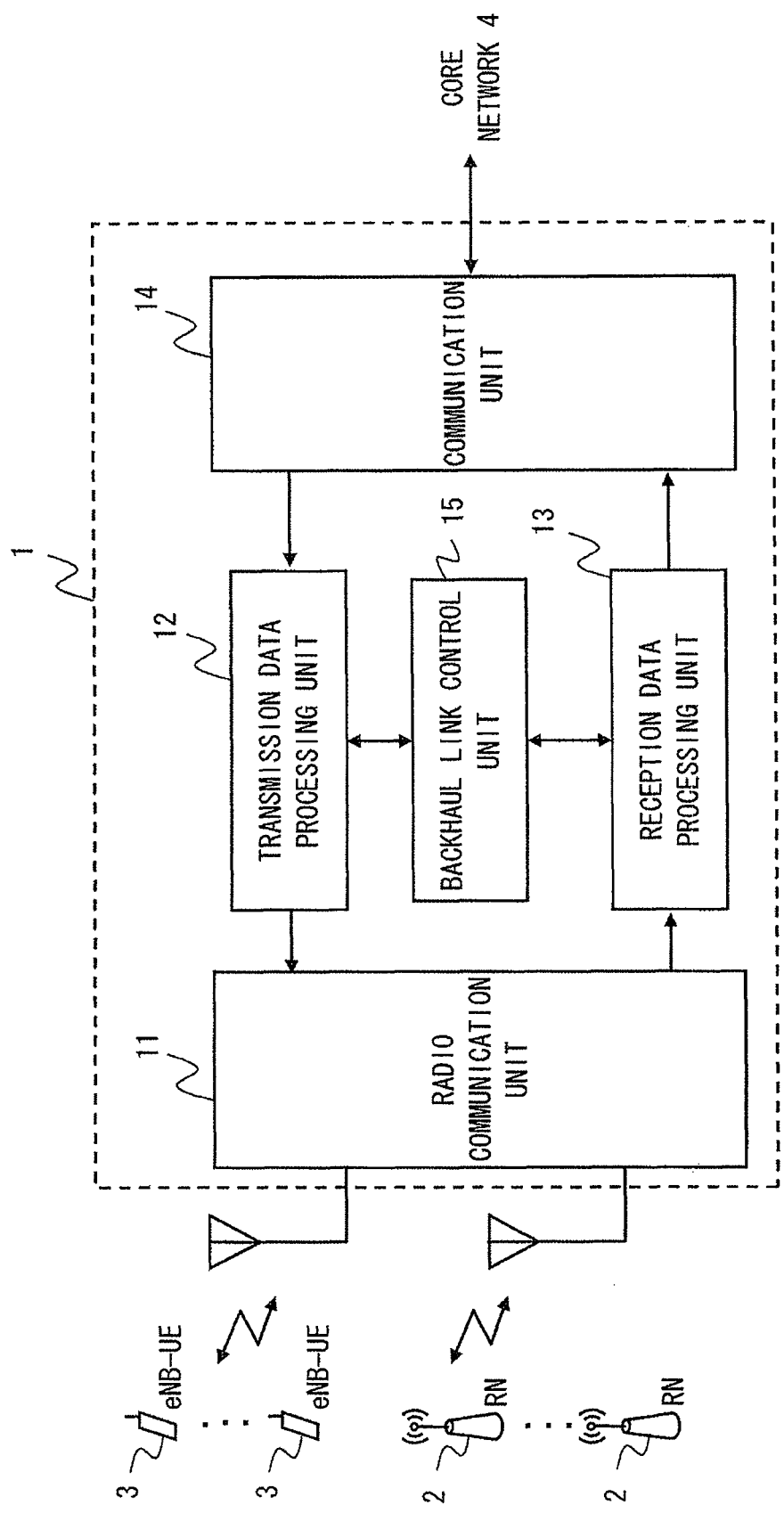
FIG. 4 is a block diagram showing a configuration example of a base station according to a first illustrative embodiment.

A configuration and an operation of a mobile communication system according to this illustrative embodiment are explained hereinafter in detail. FIG. 4 is a block diagram showing a configuration example of the base station 1. In FIG. 4, a radio communication unit 11 generates a downlink signal by performing various processes including mapping onto resource elements, OFDM signal generation (e.g., IDFT (Inverse Discrete Fourier Transform)), frequency conversion, and signal amplification for a transmission symbol sequence of a physical channel supplied from a transmission data processing unit 12. The generated downlink signal is wirelessly transmitted from an antenna. Further, the radio communication unit 11 receives an uplink signal transmitted from the mobile station 3 or the relay station 2, and restores a reception symbol sequence.

A transmission data processing unit 12 stores data that is obtained from a communication unit 14 and is to be transmitted to the mobile station or the relay station in a buffer that is arranged for each mobile station and each bearer, and generates a transport channel by performing error correction encoding, rate matching, interleaving, and the like. Further, the transmission data processing unit 12 generates a radio frame by adding control information to the data series of the transport channel. Furthermore, the transmission data processing unit 12 generates a transmission symbol sequence for each physical channel by performing scrambling and modulation symbol mapping for the data series of the radio frame.

A reception data processing unit 13 restores received data for each logical channel from a reception symbol sequence supplied from the radio communication unit 11. User traffic data and part of control data included in the obtained reception data are transferred to the core network 4 through the communication unit 14.

A backhaul link control unit 15 controls transmission timing and radio resource allocation relating to communication with the relay station 2 through the backhaul link, and information regarding the backhaul link. Further, the backhaul link control unit 15 transmits first cell management information to the relay station 2 through the transmission data processing unit 12 and the radio communication unit 11.

Figure 5:
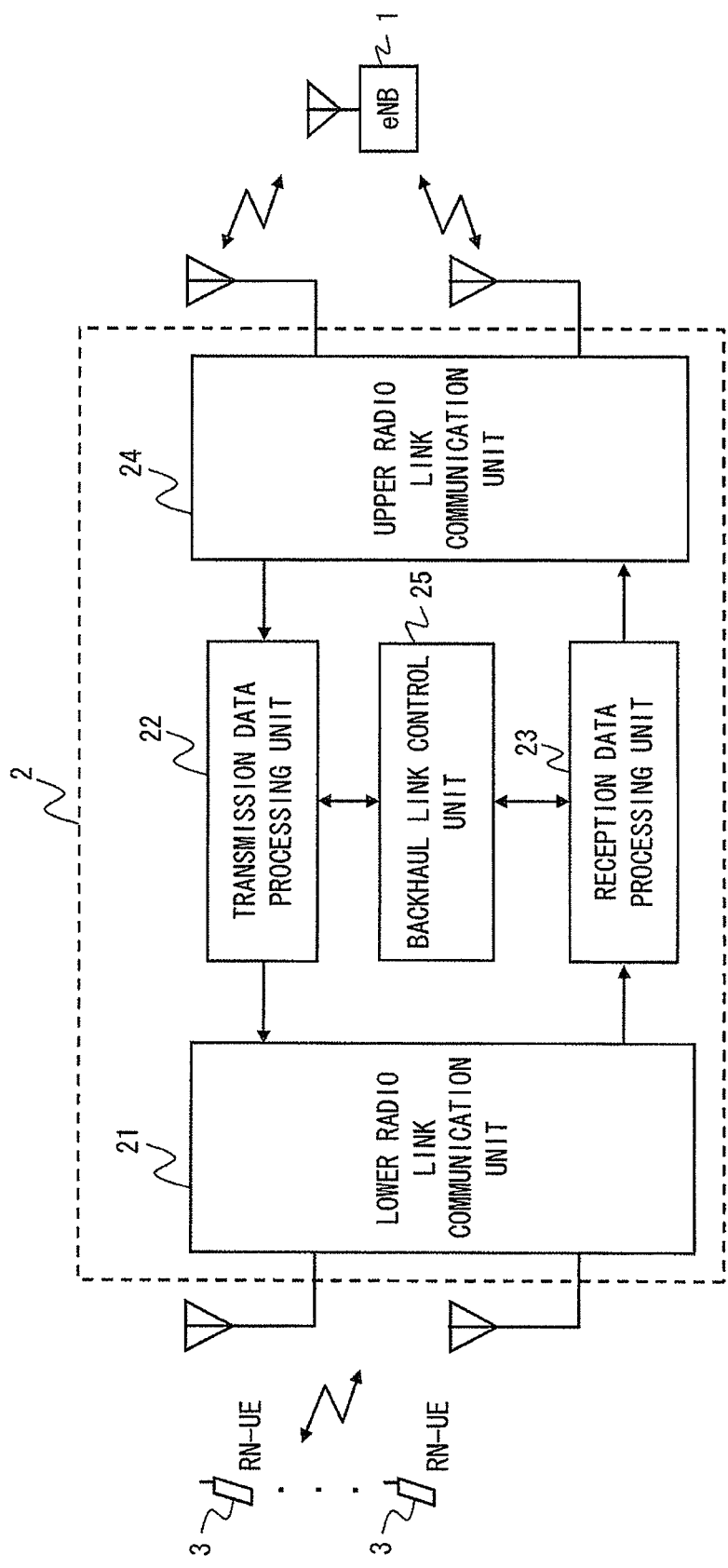
FIG. 5 is a block diagram showing a configuration example of a base station according to the first illustrative embodiment of the present invention.

FIG. 5 is a block diagram showing a configuration example of the relay station 2. The relay station has equivalent functions to those of the base station 1 unless specified otherwise. In FIG. 4, a lower radio link communication unit 21 receives an uplink signal transmitted from a mobile station 3, through an antenna. A reception data processing unit 23 has similar functions to those of the reception data unit 13 of the base station 1. Reception data obtained by the reception data processing unit 23 is transmitted to the base station 1 through an upper radio link communication unit 24.

A transmission data processing unit 22 has similar functions to those of the transmission data processing unit 12 of the base station 1, and generates a transmission symbol sequence from transmission data that is obtained from the upper radio link communication unit 24 and is to be transmitted to the mobile station 3. The lower radio link communication unit 21 generates a downlink signal from the transmission symbol sequence and transmits the generated downlink signal to the mobile station 3.

A backhaul link control unit 25 controls information regarding communication with the base station 1 through the backhaul link. For example, the backhaul link control unit 25 selects a cell used for the backhaul link. Specifically, the backhaul link control unit 25 determines a donor cell based on both the donor cell selection criteria of the base station 1 and the donor cell selection criteria of the relay station 2 by using both the first cell management information received from the base station 1 and the second cell management information administered by the relay station 2 itself.

Figure 6:
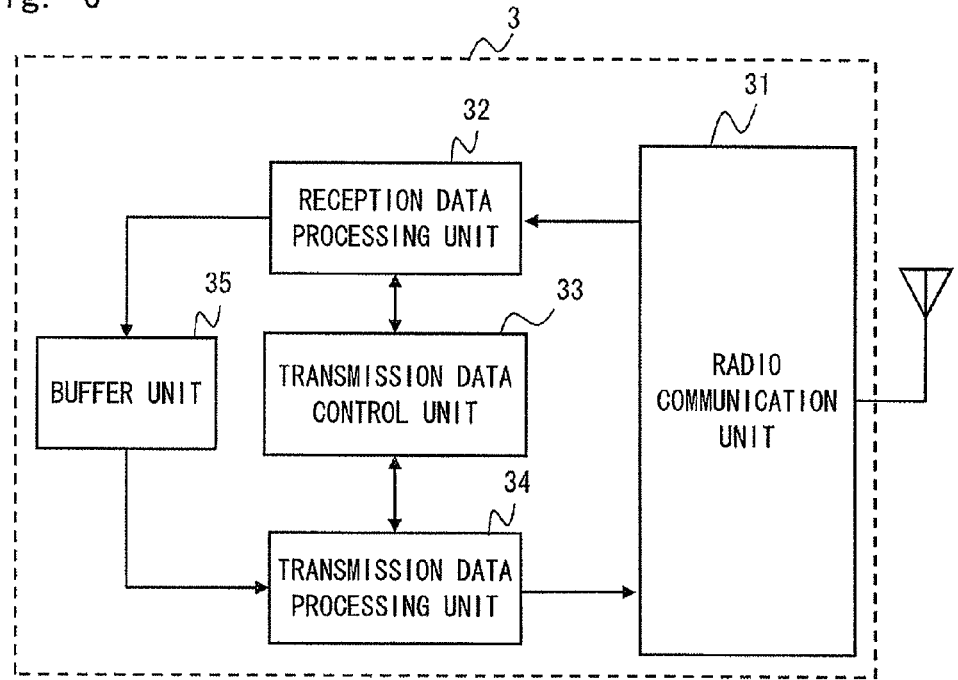
FIG. 6 is a block diagram showing a configuration example of a base station according to the first illustrative embodiment of the present invention.

FIG. 6 is a block diagram showing a configuration example of the mobile station 3. A radio communication unit 31 receives a downlink signal through an antenna. A reception data processing unit 32 sends reception data restored from the received downlink signal to a buffer unit 35. Reception data stored in the buffer unit 35 is read out and used according to the purpose. Further, a transmission data control unit 33, a transmission data processing unit 34, and the radio communication unit 31 generate an uplink signal by using transmission data stored in the buffer unit 35, and transmit the generated uplink signal to the base station 1 or the relay station 2.

Figure 7:
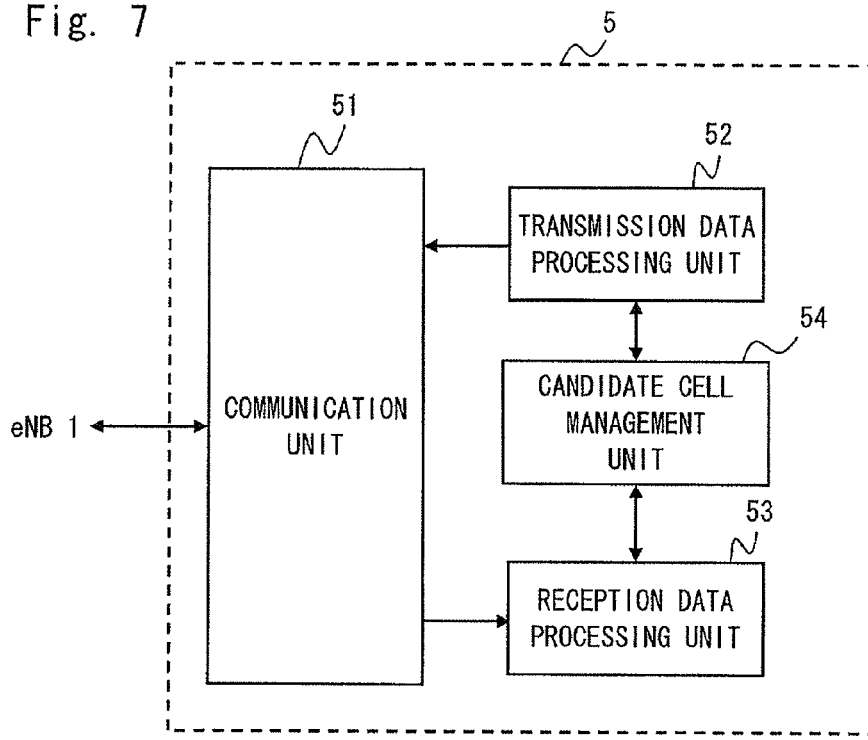
FIG. 7 is a block diagram showing a configuration example of a base station control apparatus according to the first illustrative embodiment.

FIG. 7 is a block diagram showing a configuration example of the management apparatus 5. A communication unit 51 transmits/receives a data packet to/from the relay station 2 through the core network 4. A reception data processing unit 53 restores information included in a received upward data packet. When the restored information is a signal requesting a cell list, the reception data processing unit 53 sends this information to a candidate cell management unit 54. The candidate cell management unit 54 administers at least one candidate cell (candidate donor cell) that the relay station 2 can use for the backhaul link. When a signal requesting a donor cell list is received from the relay station 2, the candidate cell management unit 54 transmits a donor cell list indicating at least one candidate cell to the relay station 2 through a transmission data processing unit 52.

Figure 8:
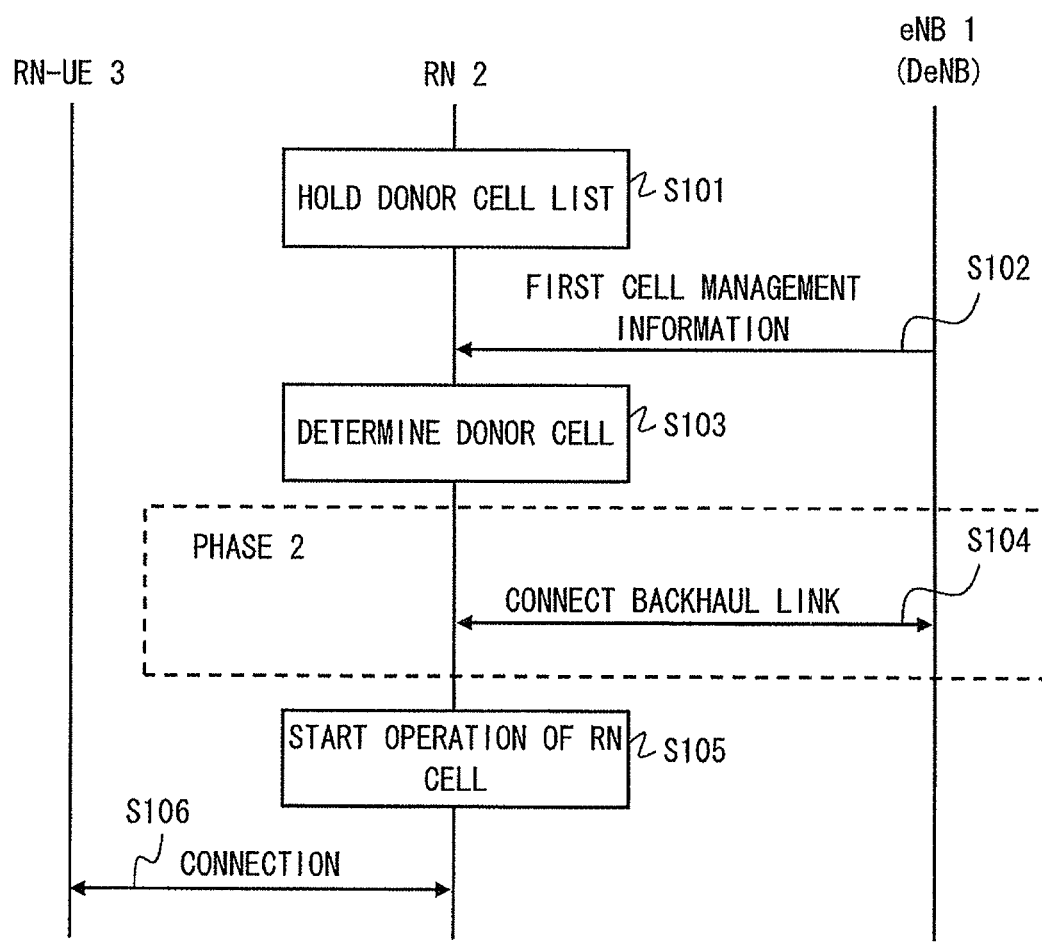
FIG. 8 is a sequence diagram showing an example of a donor cell selection procedure of a relay station according to the first illustrative embodiment.

Next, a specific example of a donor cell selection procedure according to this illustrative embodiment is explained hereinafter with reference to FIGS. 8 to 11. FIG. 8 is a sequence diagram showing an example of a donor cell selection procedure according to this illustrative embodiment. FIG. 8 shows interactions between the base station 1, the relay station 2, and mobile station 3. Further, the symbols "eNB 1", "RN 2", and "RN-UE 3" in FIG. 8 correspond to the base station 1, the relay station 2, and the mobile station 3 respectively. Note that in the example shown in FIG. 8, the base station (eNB) 1 functions as a donor base station (DeNB) that connects a backhaul link with the relay station (RN) 2.

An operation S101 indicates that the RN 2 holds a donor cell list including information of at least one candidate cell. For example, the donor cell list includes the frequency, the Cell ID, and the like of each candidate cell.

In an operation S102, the eNB 1 transmits first cell management information to the RN. As described previously, the first cell management information relates to the candidate cell for the donor cell and is administered or held by the eNB 1. The first cell management information includes, for example, the load status of the candidate cell, the connection status of other RN(s) and UE(s), and the like. Further, the first cell management information may include, in addition to the information regarding the cell operated by the eNB 1 itself, information regarding a cell(s) that is operated by a base station(s) located near or adjacent to the eNB 1.

The transmission/reception of the first cell management information in the operation S102 may be performed in the phase 1 (i.e., the phase in which the RN 2 connects to the eNB 1 as a UE) of the RN start-up procedure, or may be performed in the phase 2 (i.e., the phase in which the RN 2 connects to the eNB 1 as an RN) of the RN start-up procedure. Alternatively, the transmission/reception of the first cell management information may be performed in an independent connection phase that is different from both the phase 1 and phase 2. Further, the first cell management information may be transmitted by using a broadcast channel from the eNB 1. In this case, the RN 2 can receive the first cell management information even when the RN 2 has no RRC (Radio Resource Control) connection with the eNB 1, that is, even when the RN 2 is in an RRC IDLE state where RRC layer is not connected.

In an operation S103, the RN 2 determines a cell used for the backhaul link from at least one candidate cell indicated by the donor cell list based on the first cell management information received from the eNB and the second cell management information possessed by the RN 2 itself. As described previously, the second cell management information is administered or held by the RN. The second cell management information includes, for example, the radio quality (e.g., downlink received power) of the candidate cell, the RN type to be defined and the RN cell configuration to be configured for each candidate cell, and the performance of the RN 2. Specific examples of the donor cell determination method using the first and second cell management information are explained later.

In an operation S104, the RN 2 performs a process corresponding to the phase 2 of the RN start-up procedure. That is, the RN 2 belongs to the eNB 1 that operates the donor cell determined in the operation S103, and connects a backhaul link with the eNB 1. After finishing the backhaul link connection process, the RN 2 starts to operate an RN cell (operation S105). After that, the RN 2 allows the RN-UE 3 to connect thereto (operation S106).

Figure 9:
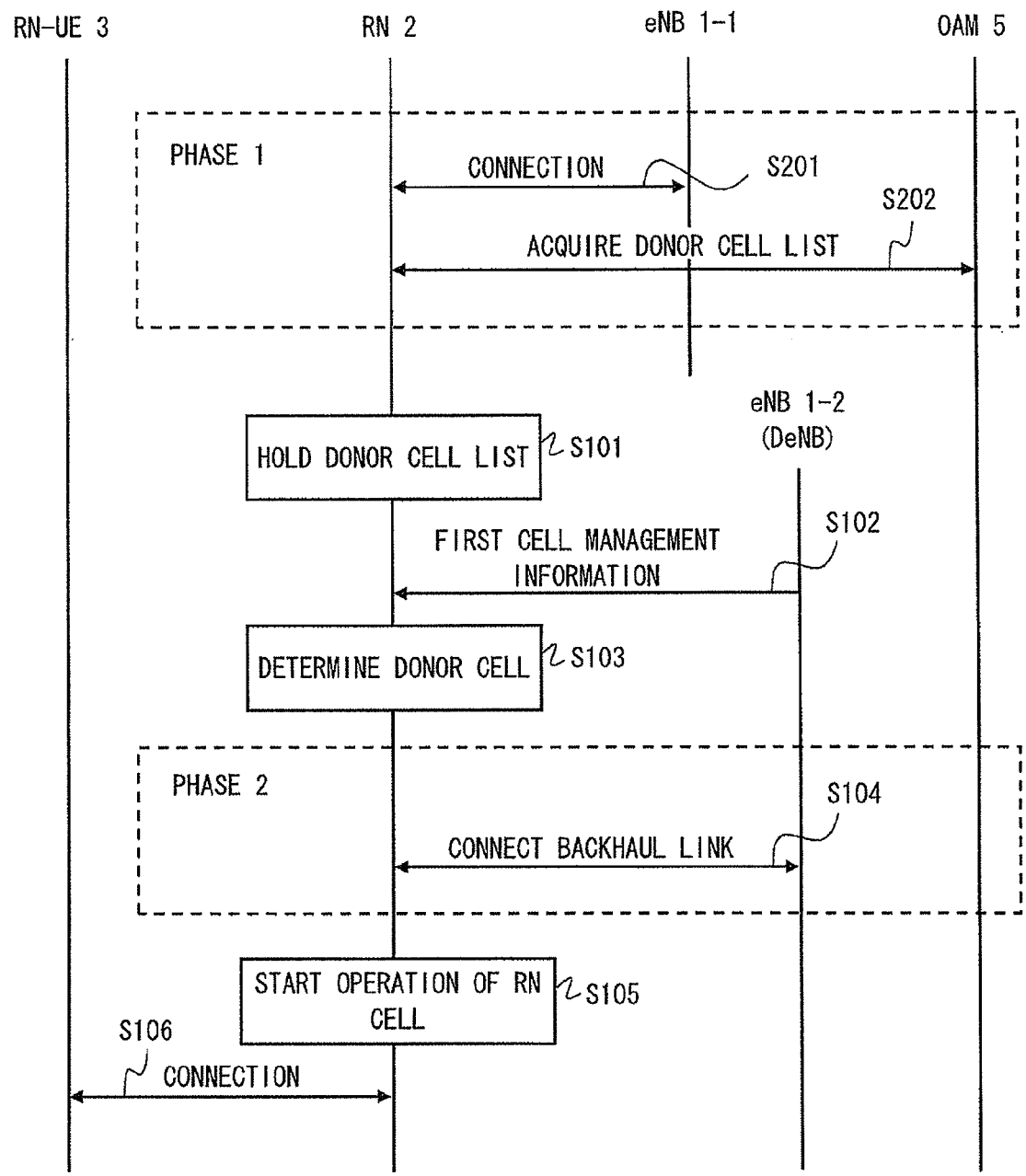
FIG. 9 is a sequence diagram showing another example of a donor cell selection procedure of a relay station according to the first illustrative embodiment.

Note that in the operation S101 of FIG. 8, the donor cell list held in the RN 2 may be supplied from the management apparatus 5 to the RN 2. Specifically, the RN 2 may acquire the donor cell list from the management apparatus 5 in the phase 1 of the RN start-up procedure. FIG. 9 shows a procedure through which the RN acquires the donor cell list from the management apparatus 5 before the operation S101 of FIG. 8 (operation S201 and S202). The symbol "OAM 5" in FIG. 9 corresponds to the management apparatus 5. Further, the base station (eNB) 1-2 in FIG. 9 corresponds to the base station (eNB) 1 in FIG. 8. Meanwhile, the base station (eNB) 1-1 in FIG. 9 is a base station to which the RN 2 belongs in the phase 1 of the RN start-up procedure in order to acquire the donor cell list. The base stations (eNBs) 1-1 and 1-2 in FIG. 9 may be different base stations or may be the same base station.

In an operation S201, the RN 2 belongs to the eNB 1-1 as a mobile station (UE) and thereby connects to the core network 4 through the eNB 1-1. In an operation S202, the RN 2 acquires the donor cell list by accessing the OAM 5 through the eNB 1-1.

The example shown in FIGS. 8 and 9 shows a case where the base station 1 (base station 1-2) to which the relay station 2 accesses to acquire the first cell management information in the operation S102 is the same as the base station 1 (base station 1-2) to which the backhaul link is connected in the subsequent operation S104. However, as described above, the first cell management information may include information of a base station(s) located near the base station 1 (e.g., adjacent base station) that is different from the base station 1 that has transmitted the first cell management information. Therefore, the base station 1 with which the relay station 2 connects the backhaul link in the operation S104 may be different from the base station 1 to which the relay station 2 accesses to acquire the first cell management information in the operation S102. The base station 1 in the operation S104 is a base station located near or adjacent to the base station 1 in the operation S102, for example.

Figure 10:
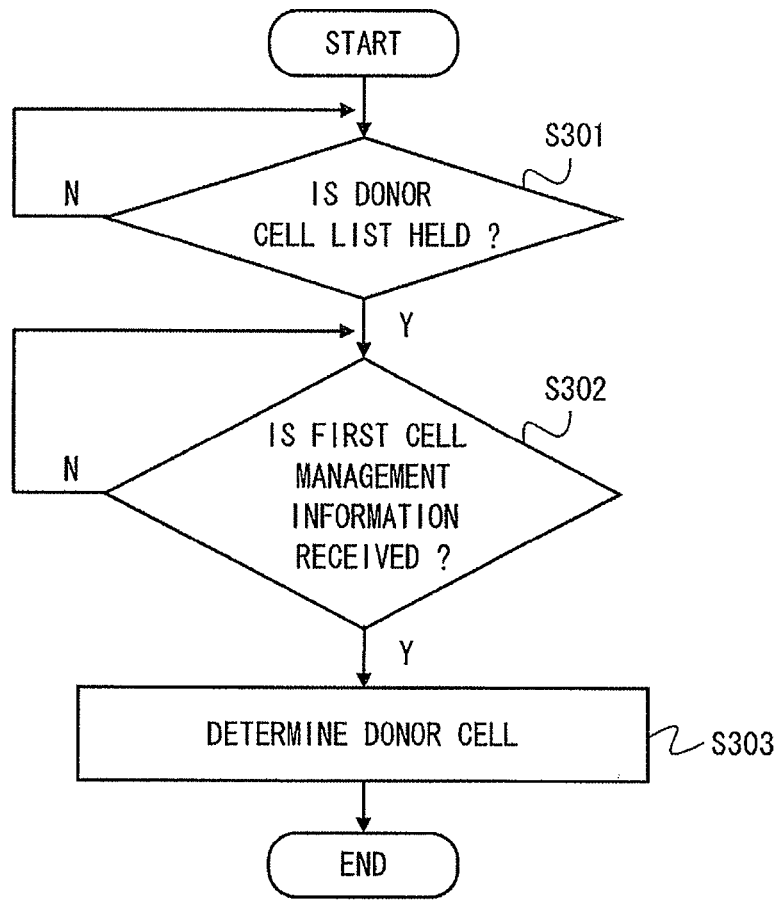
FIG. 10 is a flowchart showing an operation example of a relay station according to the first illustrative embodiment.

FIG. 10 shows a flowchart showing an operation example of the relay station 2 performed when a donor cell is determined. In an operation S301, the relay station 2 determines whether or not the relay station 2 holds a donor cell list. When the relay station 2 holds a donor cell list (Yes at operation S301), the relay station 2 proceeds to an operation S302. When the relay station 2 holds no donor cell list (No at operation S301), the relay station 2 returns to the operation S301 again.

In the operation S302, the relay station 2 determines whether or not the relay station 2 has received first cell management information from the base station 1. When the RN has received first cell management information (Yes at operation S302), the relay station 2 determines a donor cell used for the backhaul link from the donor cell list based on the first cell management information received from the base station 1 and second cell management information administered or held by the relay station 2 itself (operation S303). Then, the relay station 2 starts communication to the determined donor cell through the backhaul link and the operation of an RN cell, and finishes the process shown in FIG. 10. On the other hand, when the RN has not received first cell management information (No at operation S302), the relay station 2 returns to the operation S202 where the relay station 2 waits for the reception of first cell management information again.

Figure 11:
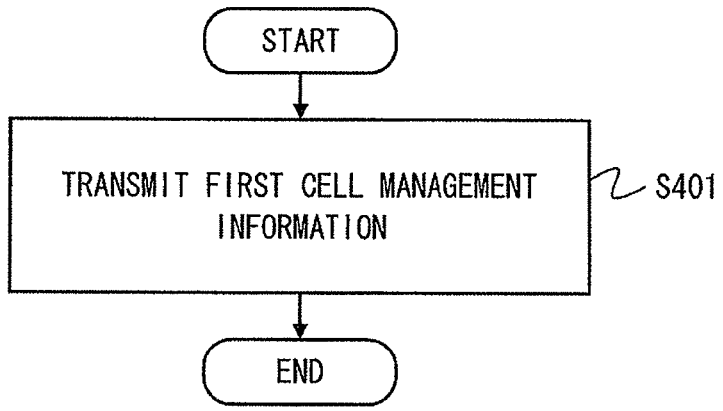
FIG. 11 is a flowchart showing an operation example of a base station according to the first illustrative embodiment.

FIG. 11 shows a flowchart showing an operation example of the base station 1 performed when a backhaul link is determined. The base station 1 sends the first cell management information to the relay station 2 (operation S301), and finishes the process.

The operation of the mobile station 3 is not different from ordinary operations, and therefore its explanation is omitted.

Next, specific examples of the donor cell determination method using first and second cell management information are explained hereinafter. Various examples can be conceivable according to the contents of the first and second cell management information. Several specific examples are explained hereinafter.

(1) Example of First Cell Management Information (1-1) Load Information of eNB Cell 10 (Cell Load)

The load of at least one eNB cell 10 operated by at least one base station 1 is used. The load of the eNB cell 10 may be expressed by, for example, a band usage ratio or the total number of UEs connecting to the cell. When this information is used for the determination of the donor cell, for example, it is conceivable to prioritize a cell having the lowest load among the at least one eNB cell 10 as the donor cell.

(1-2) Connection Status of Other Relay Station(s)

When other RN(s) has already connected a backhaul link to the eNB cell 10, whether the time-division of radio resources is implemented between the backhaul link and the access link or not is taken into consideration.

(1-3) Priority Among eNB Cells Held by Base Station 1

A priority among eNB cells that are hold by the base station 1 is used. For example, it is conceivable to lower the priority of "non-backward compatible carrier" below that of "backward compatible carrier". The "backward compatible carrier" means a cell that transmits control channels similar to those in the conventional cell when a carrier aggregation in which a plurality of carriers (carrier frequency bands) are bundled is implemented. In contrast to this, the "non-backward compatible carrier" is a carrier that is used in a dependent manner when a carrier aggregation is implemented, in which at least some of the control channels are not transmitted. The control of the "non-backward compatible carrier" is carried out by using the control channels of "backward compatible carrier". The "backward compatible carrier" and "non-backward compatible carrier" can be also called "primary cell" and "secondary cell" respectively.

(2) Example of Second Cell Management Information (2-1) Radio Quality of Candidate Cell The radio quality of at least one candidate cell indicated by a donor cell list is used. Examples of the radio quality of a candidate cell include the reception quality (e.g., received power or an SINR (Signal to Interference plus Noise power Ratio) of a downlink signal from the candidate cell). When the radio quality of a candidate cell is used for the determination of the donor cell, it is conceivable to determine the donor cell from, for example, candidate cells having a downlink reception quality equal to or higher than a predetermined level.

(2-2) Type Information of Relay Station 2

For example, the above-described RN type is used. When the RN type of the relay station 2 is Type-1a, different carries (different frequencies) are used for the backhaul link and the access link. Therefore, communication is carried out independently between the backhaul link and the access link without requiring the time-division of radio resources. Accordingly, when the RN type of the relay station 2 is Type-1a, a candidate cell in which the time-division of radio resources is not implemented may be selected and determined as the donor cell based on the first cell management information with higher priority than the one in which the time-division of resources is implemented (connection status of other relay stations in this example). Meanwhile, when the RN type of the relay station 2 is Type-1, the same carrier is used for the backhaul link and the access link. Therefore, it is necessary to implement the time-division of radio resources between the backhaul link and the access link. Accordingly, when the RN type of the relay station 2 is Type-1, a candidate cell in which the time-division of radio resources is already implemented may be selected and determined as the donor cell based on the first cell management information with higher priority than the one in which the time-division of resources is not yet implemented (connection status of other relay station(s) in this example).

(2-3) Priority Among Candidate Cells Held by Relay Station 2

A priority among candidate cells hold by the relay station 2 is used. For example, it is conceivable to lower the priority of "non-backward compatible carrier" below that of "backward compatible carrier".

(2-4) Performance of Relay Station 2

The performance of the relay station 2 such as the capacity of a buffer memory in which transfer data is held or the maximum communication speed is used. Further, similarly to UE category specified in 3GPP TS 36.306, when category classes are defined according to the performance of the relay station 2, the category classes of RN may be used. For example, when the relay station 2 is a high-performance relay station, i.e., when the capacity of the buffer memory is large and/or the maximum communication speed is high, a candidate cell in which the time-division of radio resources is not yet implemented may be selected and determined as the donor cell based on the first cell management information with higher priority than the one in which the time-division of resources is already implemented (connection status of other relay station(s) in this example). On the other hand, when the relay station 2 is a low-performance relay station, a candidate cell in which the time-division of radio resources is already implemented may be selected and determined as the donor cell based on the first cell management information with higher priority than the one in which the time-division of resources is not yet implemented (connection status of other relay station(s) in this example).

In addition to the above-described combination of the first and second cell management information, it is also possible to combine the above-listed first cell management information items and second cell management information items as desired and to use the combined information items for the determination of the donor cell. For example, when "load information of eNB cell 10 (Cell load)" and "radio quality of candidate cell" are used as the first and second cell management information respectively, a candidate cell of which the radio quality is equal to or higher than a predetermined reference level and the cell load is equal to or lower than a predetermined reference level may be determined as the donor cell.

As described above, in this embodiment, when a donor cell is selected from at least one candidate cell indicated by a donor cell list supplied from the management apparatus 5, the first and second cell management information are used. The first cell management information relates to at least one cell operated by the base station 1 and is administered or held by the base station 1. The second cell management information is administered or held by the relay station 2. In other words, the first cell management information originates from the base station 1, but the second cell management information originates from the relay node 2. That is, in this embodiment, the first cell management information as well as the second cell management information is referred to when the donor cell is determined. Therefore, in this embodiment, it is possible to determine the donor cell based on not only the donor cell selection criteria on the relay station side but also based on the donor cell selection criteria on the base station side.

Further, in this embodiment, the relay station 2 determines the donor cell. Therefore, the relay station 2 can select the donor cell with consideration given to the current status of the base station 1 such as the cell load and the connection status of other RN(s) based on the details of the first cell management information.

<Second Illustrative Embodiment>

In this embodiment, a modified example in which the base station 1 determines the donor cell by using the first and second cell management information is explained. Therefore, the relay station 2 transmits, to the base station 1, the second cell management information regarding at least one candidate cell indicated by the donor cell list received from the management apparatus 5. The base station 1 determines the donor cell by referring to the second cell management information received from the relay station 2 and first cell management information administered or held by the base station 1 itself. A configuration example of a mobile communication system according to this illustrative embodiment is similar to that of the first illustrative embodiment shown in FIG. 3. A specific example of a donor cell selection procedure according to this illustrative embodiment is explained hereinafter with reference to FIGS. 12 to 14.

Figure 12:
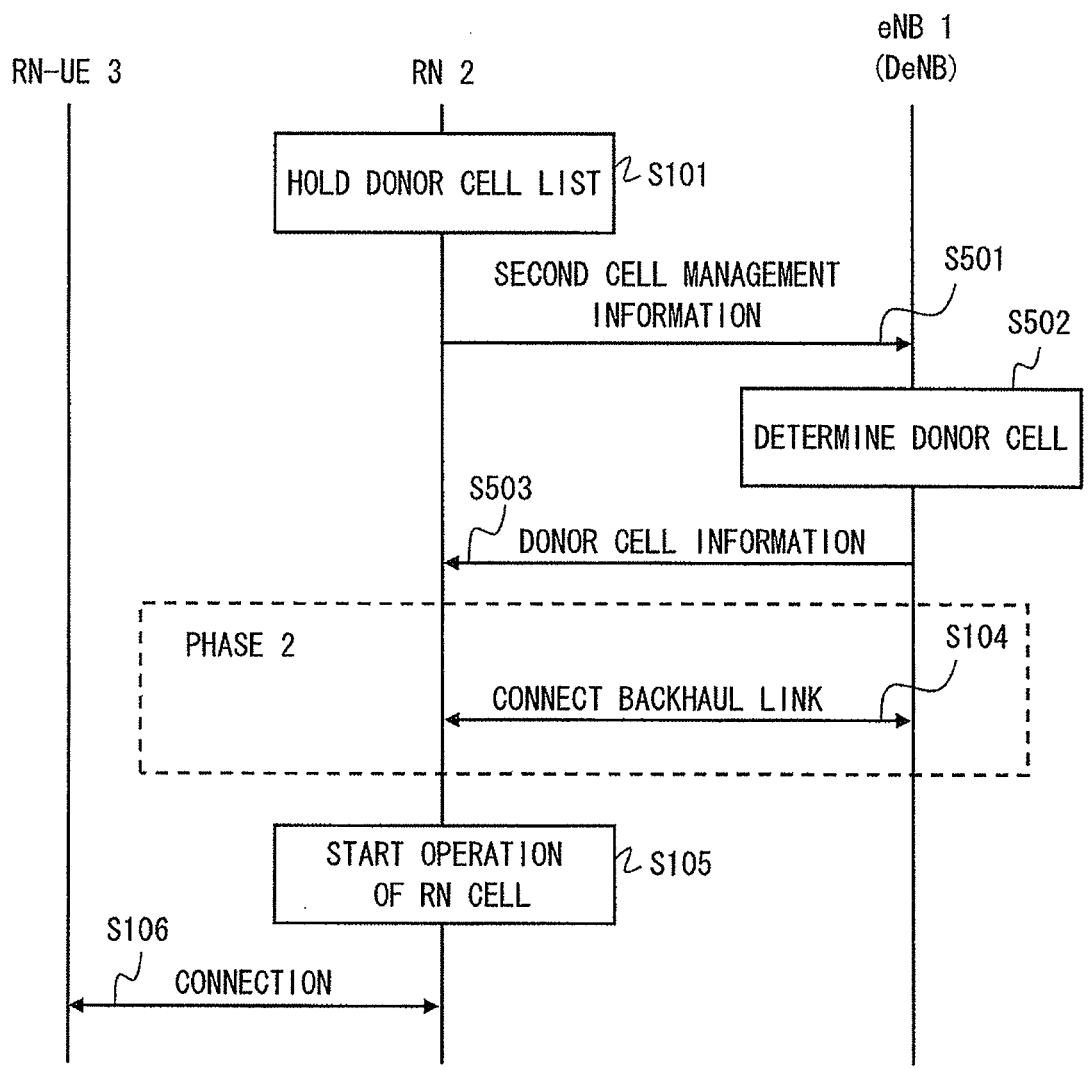
FIG. 12 is a sequence diagram showing an example of a donor cell selection procedure of a relay station according to a second illustrative embodiment.

FIG. 12 is a sequence diagram showing an example of a donor cell selection procedure according to this illustrative embodiment. The symbols "eNB 1", "RN 2", and "RN-UE 3" in FIG. 12 correspond to the base station 1, the relay station 2, and the mobile station 3 respectively. Operations S101 and S104 to S106 in FIG. 12 are similar to the operations assigned with the same numeral symbols in FIGS. 8 and 9, and therefore their explanation is omitted. In an operation S501, the relay station 2 transmits second cell management information to the base station 1. Similarly to the first embodiment, the second cell management information transmitted in the operation S501 is information originating from the relay station 2. The second cell management information includes at least one of the following items: the radio quality of at least one candidate cell that is taken by the relay station 2; and the performance condition of the donor cell requested by the relay station 2. The relay station 2 may transmit second cell management information regarding all the candidate cells indicated by the donor cell list to the base station 1, or may transmit second cell management information regarding some of candidate cells indicated by the donor cell list to the base station 1.

In an operation S502, the base station 1 determines the donor cell by referring to first cell management information administered by the base station 1 itself and the second cell management information received from the relay station 2. In an operation S503, the base station 1 transmits information regarding the determined donor cell to the relay station 2 (operation S503).

The transmission/reception of the second cell management information performed in the operation S501 and transmission/reception of the donor cell information performed in the operation S503 may be performed in the phase 1 (i.e., the phase in which the RN 2 connects to the eNB 1 as a UE) of the RN start-up procedure explained in the related art section, or may be performed in the phase 2 (i.e., the phase in which the RN 2 connects to the eNB 1 as an RN) of the RN start-up procedure. Alternatively, the transmission/reception of the second cell management information may be performed in an independent connection phase that is different from both the phase 1 and phase 2.

Note that, the example shown in FIG. 12 shows a case where the base station 1 that determines the donor cell through the procedure from the operations S501 to S503 is the same as the base station 1 with which the relay station 2 connects the backhaul link in the subsequent operation S104. However, as described previously in the first embodiment, the first cell management information may include information of a base station(s) located near the base station 1 (e.g., adjacent base station). Therefore, the donor cell determined in the operation S502 may not be a cell operated by the base station 1 itself that has made the determination, but may be a cell operated by a nearby base station. In this case, the base station 1 with which the relay station 2 connects the backhaul link in the operation S104 may be a base station different from the base station 1 that determines the donor cell through the procedure from the operations S501 to S503 (e.g., adjacent base station).

Figure 13:
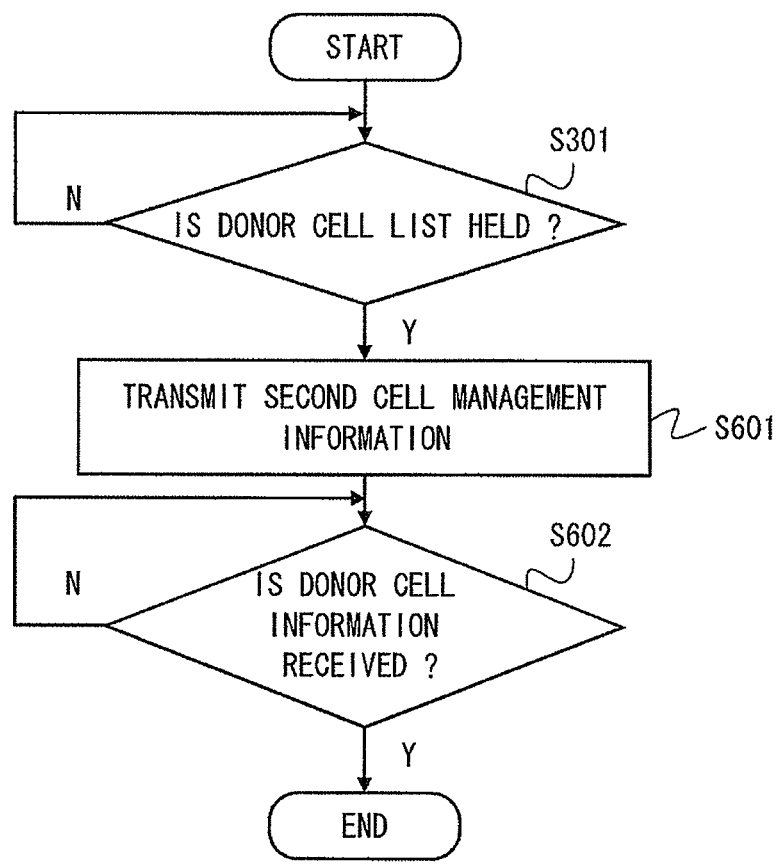
FIG. 13 is a flowchart showing an operation example of a relay station according to the second illustrative embodiment.

FIG. 13 shows a flowchart showing an operation example of the relay station 2 performed when a donor cell is determined. An operation S301 is similar to the operation assigned with the same numeral symbol in FIG. 10, and therefore its explanation is omitted. When the relay station 2 holds a donor cell list (Yes at operation S301), the relay station 2 transmits second cell management information regarding candidate cells to the base station 1 (operation S601).

In an operation S602, the relay station 2 determines whether or not the relay station 2 has received donor cell information from the base station 1. When the relay station 2 has received donor cell information (Yes at operation S602), the relay station 2 starts communication to the specified donor cell through the backhaul link and the operation of an RN cell, and finishes the process shown in FIG. 13. When the relay station 2 has not received donor cell information (No at operation S502), the relay station 2 returns to the operation S602 where the relay station 2 waits for the reception of donor cell information again.

Figure 14:
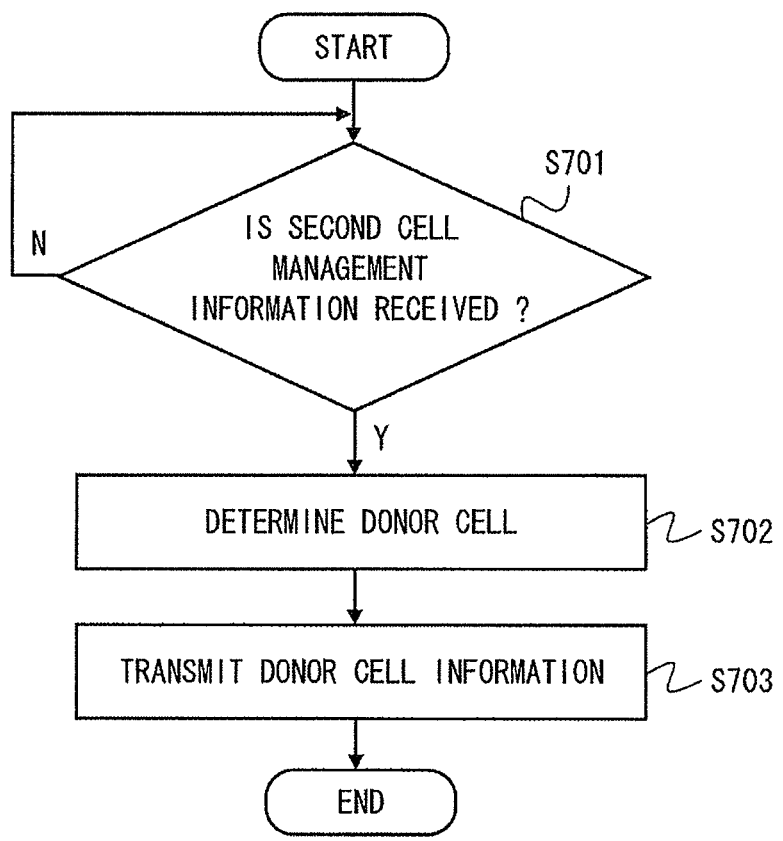
FIG. 14 is a flowchart showing an operation example of a base station according to the second illustrative embodiment.

FIG. 14 shows a flowchart showing an operation example of the base station 1 performed when a donor cell is determined. The procedure of FIG. 14 is started when the relay station 2 receives second cell management information from the base station 1.

When the base station 1 has received second cell management information (Yes at operation S701), the base station 1 determines a donor cell by referring to the second cell management information notified from the relay station 2 and the first cell management information administered by the base station 1 itself (operation S602). Specific examples of the donor cell determination method using the first and second cell management information are explained later. In an operation S703, the base station 1 transmits information regarding the determined donor cell to the relay station 2 (operation S703), and finishes the process shown in FIG. 14.

The operation of the mobile station 3 is not different from ordinary operations, and therefore its explanation is omitted.

The specific example of the donor cell determination method using first and second cell management information is similar to that described in the first embodiment.

In this embodiment, similarly to the first embodiment, when a donor cell is selected from at least one candidate cell indicated by the donor cell list supplied from the management apparatus 5, the first and second cell management information are used. Therefore, in this embodiment, it is possible to determine the donor cell based on not only the donor cell selection criteria on the relay station side but also based on the donor cell selection criteria on the base station side.

Further, in this embodiment, the base station 1 determines the donor cell. Therefore, the base station 1 can select the donor cell with consideration given to the current status of the base station 1 such as the cell load and the connection status of other RN(s) based on the details of the first cell management information.

<Third Illustrative Embodiment>

In this embodiment, a modified example of the above-described second embodiment is explained. In this embodiment, the base station 1 can transfer second cell management information received from the relay station 2, to other base stations 1. Specifically, when the second cell management information, which is transmitted from the relay station 2 and received by the base station 1-2, includes information regarding a cell operated by a base station 1-3 other than the base station 1-2, the base station 1-2 transfers the second cell management information to the corresponding base station 1-3. Then, the base station 1-3 determines a donor cell by referring to first cell management information regarding the cell operated by the base station 1-3 itself and the transferred second cell management information. A configuration example of a mobile communication system according to this illustrative embodiment is similar to that of the first illustrative embodiment shown in FIG. 3. A specific example of a donor cell selection procedure according to this illustrative embodiment is explained hereinafter with reference to FIGS. 15 and 16.

Figure 15:
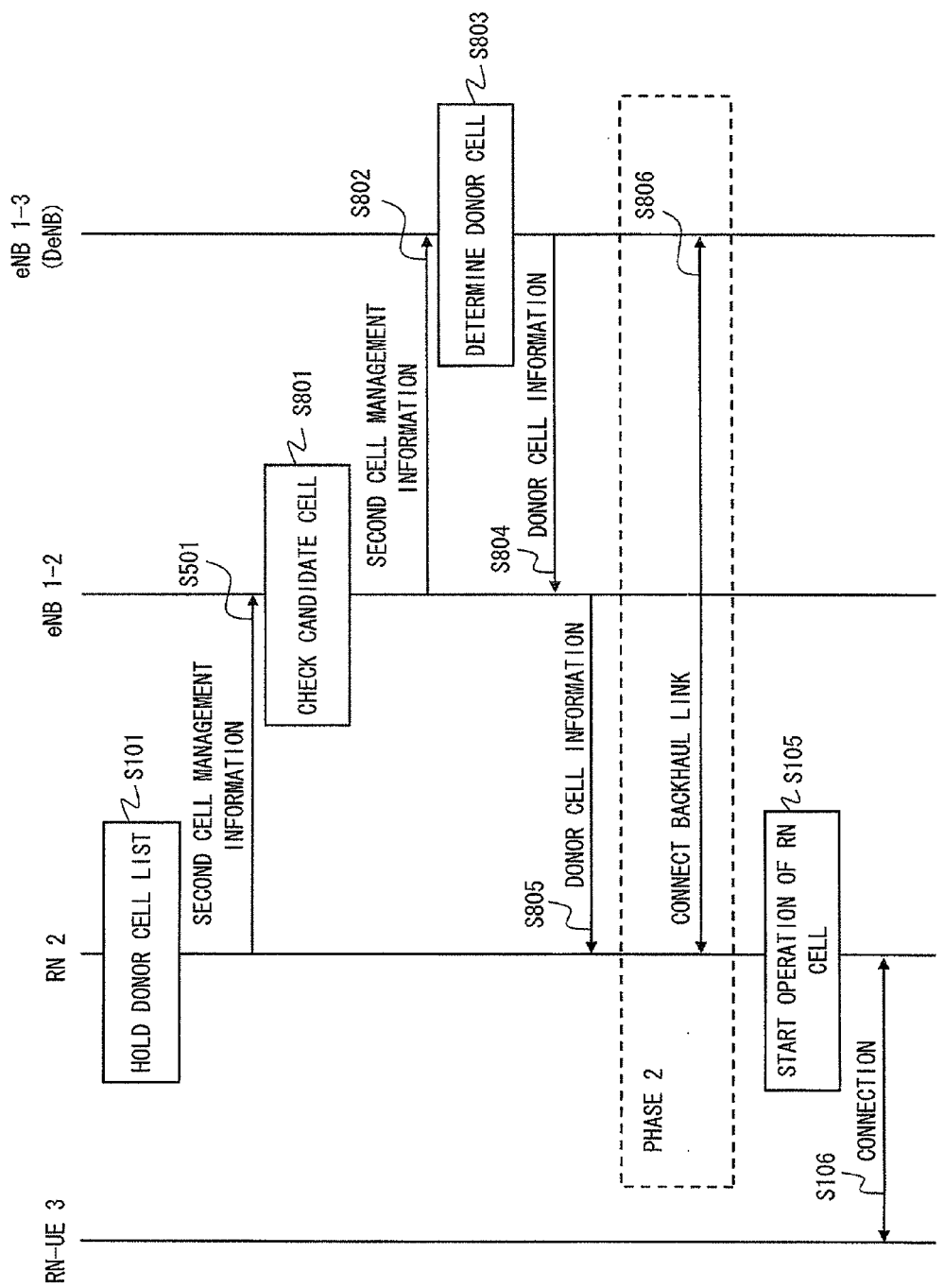
FIG. 15 is a sequence diagram showing an example of a donor cell selection procedure of a relay station according to a third illustrative embodiment.

FIG. 15 is a sequence diagram showing an example of a donor cell selection procedure according to this illustrative embodiment. Each of the symbols "eNB 1-2" and "eNB 1-3" in FIG. 15 correspond to the base station 1. Further, the symbols "RN 2" and "RN-UE 3" in FIG. 15 correspond to the relay station 2 and the mobile station 3 respectively. Operations S101, S501, S105 and S106 in FIG. 15 are similar to the operations assigned with the same numeral symbols in FIG. 12, and therefore their explanation is omitted.

In an operation S801, the eNB 1-2 checks candidate cells indicated by second cell management information received from the RN 2. When the second cell management information includes information regarding a cell operated by an eNB 1-3 different from the eNB 1-2, the eNB 1-2 transfers this second cell management information to the eNB 1-3 (operation S802).

In an operation S803, the eNB 1-3 determines a donor cell by referring to the transferred second cell management information and first cell management information regarding the cell operated by the eNB 1-3 itself. In an operation S804, the eNB 1-3 transmits information regarding the determined donor cell to the eNB 1-2. In an operation S805, the eNB 1-2 transfers the information regarding the donor cell received from the eNB 1-3 to the RN 2. In an operation S806, the RN 2 performs a process, based on the donor cell information received from the eNB 1-2, the RN 2 belongs to the eNB 1-3 operating that donor cell as an RN and connects the backhaul link.

Figure 16:
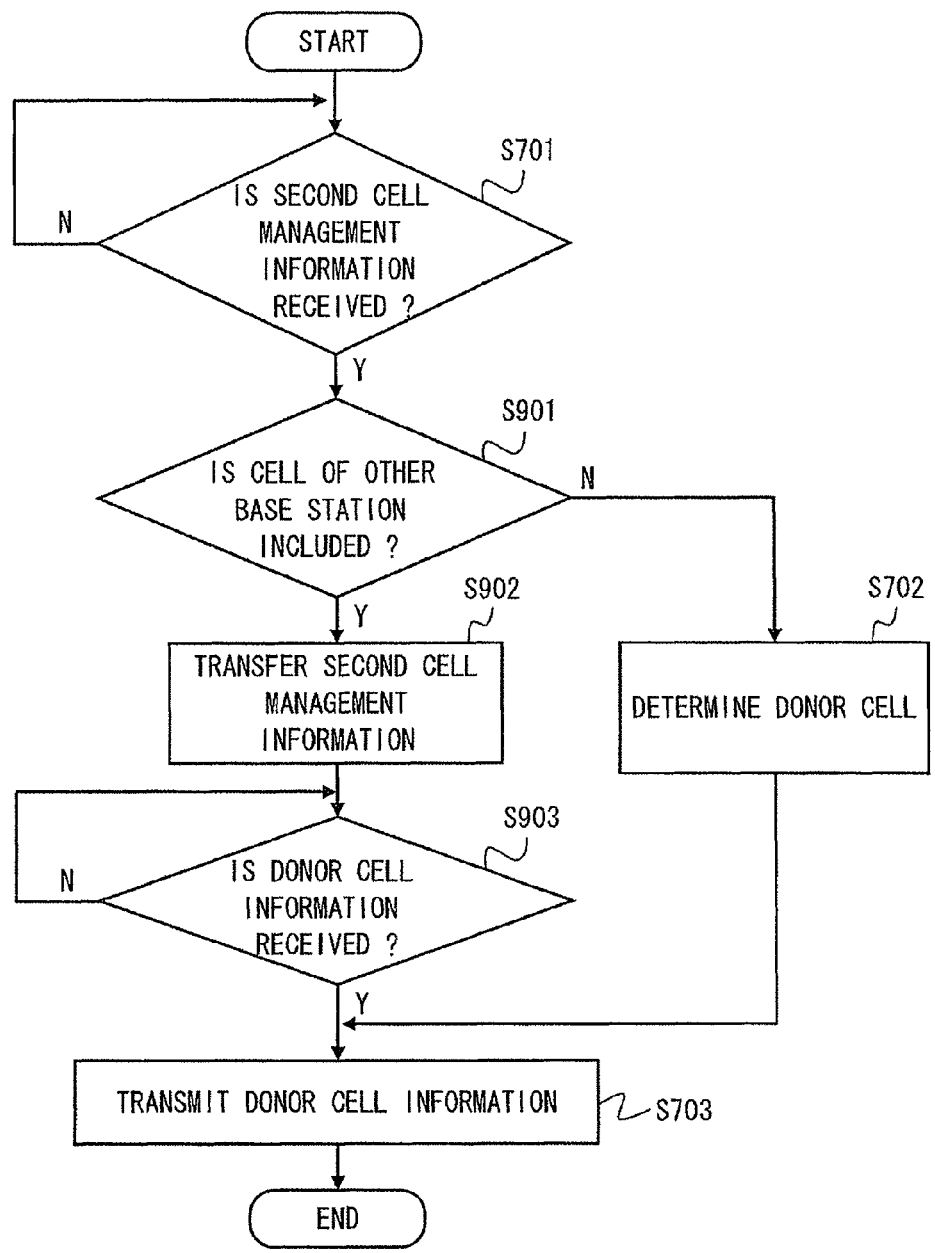
FIG. 16 is a flowchart showing an operation example of a base station according to the third illustrative embodiment.

FIG. 16 shows a flowchart showing an operation example of the base station 1 performed when a donor cell is determined. The flowchart shown in FIG. 16 relates to an operation of the base station 1 (eNB 1-2 in FIG. 15) that receives second cell management information from the relay station 2. Operations S601, S602 and S603 in FIG. 16 are similar to the operations assigned with the same numeral symbols in FIG. 14, and therefore their explanation is omitted.

In an operation S901, the base station 1 (eNB 1-2) determines whether the second cell management information received from the relay station 2 indicates a cell operated by a base station 1 (eNB 1-3) other than the base station 1 (eNB 1-2) itself. When the second cell management information indicates a cell operated by another base station 1 (Yes at operation S901), the base station 1 (eNB 1-2) transfers the second cell management information to the corresponding base station 1 (eNB 1-3) operating the indicated cell (operation S902). When the second cell management information does not indicate any cell operated by other base stations 1 (No at operation S901), the base station 1 (eNB 1-2) determines the donor cell in a similar manner to that of the second embodiment (operation S702). In an operation S903, the base station 1 (eNB 1-2) determines whether the base station 1 (eNB 1-2) has received donor cell information from the another base station 1 (eNB 1-3) or not. When the base station 1 (eNB 1-2) has received donor cell information (Yes at operation S903), the base station 1 (eNB 1-2) transfers the donor cell information to the relay station 2 and finishes the process shown in FIG. 16. When the base station 1 (eNB 1-2) has not received donor cell information (No at operation S903), the base station 1 (eNB 1-2) returns to the operation S1103 where the base station 1 (eNB 1-2) waits for the reception of donor cell information again.

The operation of the RN 2 is similar to that of the second embodiment, and therefore its explanation is omitted. Further, the operation of the mobile station 3 is not different from ordinary operations, and therefore its explanation is omitted.

As described above, in this illustrative embodiment, when the second cell management information, which is transmitted from the relay station 2 and received by the base station 1, indicates a candidate cell operated by another base station, the base station 1 transfers the second cell management information to the other base station operating the indicated candidate cell. Then, the other base station operating the indicated candidate cell determines a donor cell by referring to the first cell management information regarding the indicated candidate cell and the transferred second cell management information. This embodiment may be suitable for cases where the donor cell is switched while the relay station is operating an RN cell, for example, for handovers between relay stations 2 (i.e. Mobile Relay) that can be moved such as relay stations installed in buses, trains, and the like.

<Other Illustrative Embodiments>

In the above-described first to third illustrative embodiments, examples of an LTE-Advanced-type mobile communication system are explained. However, the application is not limited to LTE-Advanced-type mobile communication systems. That is, the inventive concept can be widely applied to mobile communication systems including a relay station.

Any of the processes of the base station 1 and the relay station 2 that are performed for determining a donor cell as described in the above-described first to third illustrative embodiments may be implemented by using a semiconductor processing device such as an ASIC (Application Specific Integrated Circuit) or a DSP (Digital Signal Processor). Alternatively, these processes may be implemented by causing a computer such as a microprocessor to execute a program. Specifically, a program including instructions to cause a computer to execute an algorithm shown in at least one of FIGS. 10, 11, 13, 14 and 16 may be created, and the created program may be supplied to a computer.

This program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Further, the first to third illustrative embodiments can be combined as desired.

For the setting-up and handover of the relay station, it is desirable that determination of the donor cell is performed in a shorter time in comparison to the setting-up and handover of the mobile station. This is because the faster determination can prevent the communication disconnection of the RN-UE. In the handover of mobile stations, the target cell is typically determined by selecting a cell of which the quality of the downlink reception at the mobile station is the best from a neighbor cell list supplied from the source base station. If this target cell determination method used in the handover of mobile stations is applied to relay stations, only the circumstances on the relay station side and the requirement conditions from the relay station to the donor cell are taken into consideration. As a result, as stated previously as the problem to be solved, if the base station cannot allow the relay station to belong to the base station due to the circumstances on the base station side, the relay station is rejected from belonging to the base station. In contrast to this, in each of the above-described embodiments, the donor cell is determined with consideration given to not only the circumstances/requirement conditions on the relay station side but also to the circumstances/requirement conditions on the base station side. Therefore, in each of the above-described embodiments, it is possible to select an appropriate candidate cell as a donor cell in a short time and thereby to prevent the frequent occurrences of the repetition of the initial start-up procedure and the handover procedure, which would otherwise occur due to the unsuccessful donor cell selection.

Further, the inventive concept is not limited to the above-described illustrative embodiments, and needless to say, various modifications can be made without departing from the spirit and scope of the description above.

What is claimed is:

1. A mobile communication system comprising:
   at least one base station; and
   a relay station that relays transmission and reception data to and from a mobile station by using a backhaul link connected to one of the at least one base station and an access link connected to the mobile station, wherein the relay station is configured to acquire a donor cell list indicating at least one candidate cell, one of a first base station, included in the at least one base station, and the relay station is configured to determine a donor cell, to be connected to the relay station by the backhaul link, from the donor cell list based on both first cell management information and second cell management information, the first cell management information relates to the at least one candidate cell and originates from the at least one base station, and the second cell management information originates from the relay station, the first cell management information includes cell configuration information indicating a time-division implementing status of a radio resource of the at least one candidate cell, the second cell management information includes type information of the relay station indicating whether a radio resource time-division of the backhaul link is necessary, and when a type of the relay station indicates that a radio resource time-division is necessary between an access link and a backhaul link, the first base station or the relay station determines a cell in which a radio resource time-division is already implemented among the at least one candidate cell as the donor cell.

2. The mobile communication system according to claim 1, wherein the first cell management information includes a first parameter to be used by the at least one base station if the at least one candidate cell is determined as the donor cell, and the second cell management information includes a second parameter to be used by the relay station if the at least one candidate cell is determined as the donor cell.

3. The mobile communication system according to claim 2, wherein the first parameter includes at least one of: an operation status associated with the at least one candidate cell and a performance condition of the at least one candidate cell requested by the at least one base station to be the donor cell, and the second parameter includes at least one of: a radio quality of the at least one candidate cell and a performance condition of the at least one candidate cell requested by the relay station to be the donor cell.

4. The mobile communication system according to claim 1, wherein the first cell management information further includes at least one of (1) a load of the at least one candidate cell, (2) a connection status to the at least one candidate cell from another relay station, (3) a priority among the at least one candidate cell as stored in the at least one base station, and (4) a list of cells selected by the at least one base station based on at least one of the aforementioned items (1) to(3).

5. The mobile communication system according to claim 1, wherein the second cell management information further includes at least one of (a) a reception quality of a down link signal from the at least one candidate cell, (b)type information of the relay station, (c) performance of the relay station, (d) a priority among the at least one candidate cell as stored in the relay station, and (e) a list of cells selected by the relay station based on at least one of the aforementioned items (a) to (d).

6. The mobile communication system according to claim 1, wherein the second cell management information further includes performance information relating to a data transfer capability of the relay station, when the relay station possesses a first performance, the first base station or the relay station determines a cell in which a radio resource time-division is already implemented among the at least one candidate cell as the donor cell, and when the relay station possesses a second performance with a data transfer capability higher than that of the first performance, the first base station or the relay station determines a cell in which a radio resource time-division is not yet implemented among the at least one candidate cell as the donor cell.

7. The mobile communication system according to claim 4, wherein the priority among the at least one candidate cell is determined in such a manner that a priority of a second cell is lower than a priority of a first cell, the second cell being dependently formed under condition of formation of the first cell.

8. The mobile communication system according to claim 7, wherein the first cell is backward compatible carrier, and the second cell is non-backward compatible carrier.

9. The mobile communication system according to claim 1, wherein the relay station receives the first cell management information transmitted from at least one second base station included in the at least one base station and thereby determines the donor cell.

10. The mobile communication system according to claim 9, wherein the first cell management information includes information regarding a cell selected from the at least one candidate cell that satisfies a predetermined condition.

11. The mobile communication system according to claim 10, wherein the predetermined condition relates to a load of the at least one candidate cell.

12. The mobile communication system according to claim 11, wherein the at least one second base station transmits the first cell management information including information regarding a cell that is selected from the at least one candidate cell on a basis of its cell load.

13. The mobile communication system according to claim 10, wherein the predetermined condition relates to a priority among the at least one candidate cell.

14. The mobile communication system according to claim 13, wherein the first cell management information includes information regarding a cell that is selected from the at least one candidate cell based on the priority.

15. The mobile communication system according to claim 9, wherein the at least one second base station transmits the first cell management information including information regarding a candidate cell operated by another base station.

16. The mobile communication system according to claim 1, wherein the first base station receives the second cell management information transmitted from the relay station and thereby determines the donor cell.

17. The mobile communication system according to claim 9, wherein the second cell management information includes information regarding a cell selected from the at least one candidate cell that satisfies a predetermined condition.

18. The mobile communication system according to claim 17, wherein the predetermined condition relates to reception quality of a downlink signal from the at least one candidate cell.

19. The mobile communication system according to claim 18, wherein the relay station transmits the second cell management information including information regarding a cell that is selected from the at least one candidate cell on a basis of the reception quality.

20. The mobile communication system according to claim 16, wherein the relay station transmits the second cell management information including information regarding a candidate cell operated by the first base station.

21. The mobile communication system according to claim 16, wherein the first base station receives the second cell management information via another base station included in the at least one base station.

22. The mobile communication system according to claim 16, wherein when the second cell management information received from the relay station includes information regarding a cell operated by the first base station, the another base station transfers the second cell management information to the first base station and transfers information regarding the donor cell received from the first cell to the relay station.

23. The mobile communication system according to claim 1, wherein the relay station connects to one of the at least one base station as a mobile station and thereby acquires the donor cell list from a management apparatus via the one of the at least one base station.

24. The mobile communication system according to claim 1, wherein the relay station acquires the donor cell list from the at least one base station.

25. A relay station apparatus comprising:
a radio communication unit configured to relay transmission and reception data to and from a mobile station by using a backhaul link connected to one of at least one base station and an access link connected to the mobile station; and
a control unit configured to control the backhaul link,
wherein the control unit acquires a donor cell list indicating at least one candidate cell through the radio communication unit, maintains second cell management information and determines a donor cell, to be connected to the relay station by the backhaul link, from the donor cell list in response to receiving first cell management information relating to the at least one candidate cell from the at least one base station,
the first cell management information includes cell configuration information indicating a time-division implementing status of a radio resource of the at least one candidate cell,
the second cell management information includes type information of the relay station indicating whether a radio resource time-division of the backhaul link is necessary, and
when a type of the relay station apparatus indicates that a radio resource time-division is necessary between a backhaul link and an access link, the control unit determines a cell in which a radio resource time-division is already implemented among the at least one candidate cell as the donor cell.

26. The relay station apparatus according to claim 25, wherein
the first cell management information includes a first parameter to be used by the at least one base station if the at least one candidate cell is determined as the donor cell, and
the second cell management information includes a second parameter to be used by the relay station apparatus if the at least one candidate cell is determined as the donor cell.

27. The relay station apparatus according to claim 26, wherein the first parameter includes at least one of an operation status associated with the at least one candidate cell and a performance condition of the at least one candidate cell requested by the at least one base station to be the donor cell, and
the second parameter includes at least one of a radio quality of the at least one candidate cell apparatus and a performance condition of the donor cell requested by the relay station apparatus to be the donor cell.

28. The relay station apparatus according to claim 25, wherein the first cell management information further includes at least one of (1) a load of the at least one candidate cell, (2) a connection status to the at least one candidate cell from another relay station, (3) a priority among the at least one candidate cell as stored in the at least one base station, and (4) a list of cells selected by the at least one base station based on at least one of the aforementioned items (1) to (3).

29. The relay station apparatus according to claim 25, wherein the second cell management information further includes at least one of (a) a reception quality of a down link signal from the at least one candidate cell, (b) type information of the relay station apparatus, (c) performance of the relay station apparatus,(d) a priority among the at least one candidate cell as stored in the relay station apparatus, and (e) a list of cells selected by the relay station apparatus based on at least one of the aforementioned items (a) to (d).

30. The relay station apparatus according to claim 25, wherein
the second cell management information further includes performance information relating to a data transfer capability of the relay station apparatus,
when the relay station apparatus possesses a first performance, the control unit determines a cell in which a radio resource time-division is already implemented among the at least one candidate cell as the donor cell, and
when the relay station apparatus possesses a second performance with a data transfer capability higher than that of the first performance, the control unit determines a cell in which a radio resource time-division is not yet implemented among the at least one candidate cell as the donor cell.

31. The relay station apparatus according to claim 25, wherein the relay station apparatus connects to one of the at least one base station as a mobile station and thereby acquires the donor cell list from a management apparatus via the one of the at least one base station.

32. The relay station apparatus according to claim 25, wherein the control unit receives the first cell management information transmitted from at least one second base station included in the at least one base station and thereby determines the donor cell.

33. A base station apparatus comprising:
a radio communication unit configured to perform data transfer, through a backhaul link connected to a relay station, with a mobile station connected to the relay station by means of an access link; and
a control unit configured to control the backhaul link,
wherein the control unit maintains or receives, from another base station apparatus, first cell management information and determines a donor cell, to be connected to the relay station by the backhaul link from the donor cell list in response to receiving second cell management information from the relay station,
the first cell management information relates to the at least one candidate cell, the first cell management information includes cell configuration information indicating a time-division implementing status of a radio resource of the at least one candidate cell, the second cell management information includes type information of the relay station indicating whether a radio resource time-division of the backhaul link is necessary, and when a type of the relay station indicates that a radio resource time-division is necessary between an access link and a backhaul link, the control unit determines a cell in which a radio resource time-division is already implemented among the at least one candidate cell as the donor cell.

34. The base station apparatus according to claim 33, wherein the first cell management information includes a first parameter to be used by the at least one base station if the at least one candidate cell is determined as the donor cell, and the second cell management information includes a second parameter that is used by the relay station if the at least one candidate cell is determined as the donor cell.

35. The base station apparatus according to claim 34, wherein the first parameter includes at least one of an operation status associated with the at least one candidate cell and a performance condition of the donor cell requested by the at least one base station to be the donor cell, and the second parameter includes at least one of a radio quality of the at least one candidate cell measured or held by the relay station and a performance condition of the at least one candidate cell requested by the relay station to be the donor cell.

36. The base station apparatus according to claim 33, wherein the first cell management information further includes at least one of (1) a load of the at least one candidate cell, (2) a connection status to the at least one candidate cell from another relay station, (3) a priority among the at least one candidate cell as stored in the at least one base station, and (4) a list of cells selected by the at least one base station based on at least one of the aforementioned items (1) to (3).

37. The base station apparatus according to claim 33, wherein the second cell management information further includes at least one of (a) a reception quality of a down link signal from the at least one candidate cell, (b) type information of the relay station, (c) performance of the relay station, (d) a priority among the at least one candidate cell as stored in the relay station, and (e) a list of cells selected by the relay station based on at least one of the aforementioned items (a) to (d).

38. The base station apparatus according to claim 33, wherein the control unit receives the second cell management information transmitted from relay station and thereby determines the donor cell.

39. The base station apparatus according to claim 33, wherein the control unit receives the second cell management information via another base station included in the at least one base station.

40. A control method of a relay station apparatus configured to relay transmission/reception data of a mobile station by using a backhaul link connected to one of at least one base station and an access link connected to the mobile station, the control method comprising:

acquiring a donor cell list indicating at least one candidate cell;

maintaining second cell management information; and determining a donor cell, to be connected to the relay station apparatus by the backhaul link, from the donor cell list in response to receiving first cell management information relating to the at least one candidate cell from the at least one base station, wherein the first cell management information includes cell configuration information indicating a time-division implementing status of a radio resource of the at least one candidate cell, the second cell management information includes type information of the relay station indicating whether a radio resource time-division of the backhaul link is necessary, and said determining includes, when a type of the relay station apparatus indicates that a radio resource time-division is necessary between a backhaul link and an access link, determining a cell in which a radio resource time-division is already implemented among the at least one candidate cell as the donor cell.

41. A control method of a base station apparatus configured to perform data transfer, through a backhaul link connected to a relay station, with a mobile station connected to the relay station by means of an access link, the control method comprising:

maintaining or receives, from another base station apparatus, first cell management information; and determining a donor cell, to be connected to the relay station by the backhaul link, from the donor cell list in response to receiving second cell management information from the relay station, wherein the first cell management information relates to the at least one candidate cell, the first cell management information includes cell configuration information indicating a time-division implementing status of a radio resource of the at least one candidate cell, the second cell management information includes type information of the relay station indicating whether a radio resource time-division of the backhaul link is necessary, and said determining includes, when a type of the relay station indicates that a radio resource time-division is necessary between an access link and a backhaul link, determining a cell in which a radio resource time-division is already implemented among the at least one candidate cell as the donor cell.

42. A non-transitory computer readable medium storing a program for causing a computer to carry out a control method of a relay station apparatus configured to relay transmission/reception data of a mobile station by using a backhaul link connected to one of at least one base station and an access link connected to the mobile station, wherein the control method comprising:

acquiring a donor cell list indicating at least one candidate cell;

maintaining second cell management information; and determining a donor cell, to be connected to the relay station apparatus by the backhaul link, from the donor cell list in response to receiving first cell management information relating to the at least one candidate cell from the at least one base station, wherein the first cell management information includes cell configuration information indicating a time-division implementing status of a radio resource of the at least one candidate cell, the second cell management information includes type information of the relay station indicating whether a radio resource time-division of the backhaul link is necessary, and said determining includes, when a type of the relay station apparatus indicates that a radio resource time-division is necessary between a backhaul link and an access link, determining a cell in which a radio resource time-division is already implemented among the at least one candidate cell as the donor cell.

43. A non-transitory computer readable medium storing a program for causing a computer to carry out a control method of a base station apparatus configured to perform data transfer, through a backhaul link connected to a relay station, with a mobile station connected to the relay station by means of an access link, wherein the control method comprising:

maintaining or receives, from another base station apparatus, first cell management information; and determining a donor cell, to be connected to the relay station by the backhaul link, from the donor cell list in response to receiving second cell management information from the relay station, wherein the first cell management information relates to the at least one candidate cell, the first cell management information includes cell configuration information indicating a time-division implementing status of a radio resource of the at least one candidate cell, the second cell management information includes type information of the relay station indicating whether a radio resource time-division of the backhaul link is necessary, and said determining includes, when a type of the relay station indicates that a radio resource time-division is necessary between an access link and a backhaul link, determining a cell in which a radio resource time-division is already implemented among the at least one candidate cell as the donor cell.

44. A mobile communication system comprising:

at least one base station; and a relay station that relays transmission and reception data to and from a mobile station by using a backhaul link connected to one of the at least one base station and an access link connected to the mobile station, wherein the relay station is configured to acquire a donor cell list indicating at least one candidate cell, one of a first base station, included in the at least one base station, and the relay station is configured to determine a donor cell, to be connected to the relay station by the backhaul link, from the donor cell list based on both first cell management information and second cell management information, the first cell management information relates to the at least one candidate cell and originates from the at least one base station, and the second cell management information originates from the relay station, the first cell management information includes cell configuration information indicating a time-division implementing status of a radio resource of the at least one candidate cell, the second cell management information includes performance information relating to a data transfer capability of the relay station, when the relay station possesses a first performance, the first base station or the relay station determines a cell in which a radio resource time-division is already implemented among the at least one candidate cell as the donor cell, and when the relay station possesses a second performance with a data transfer capability higher than that of the first performance, the first base station or the relay station determines a cell in which a radio resource time-division is not yet implemented among the at least one candidate cell as the donor cell.

45. A relay station apparatus comprising:

a radio communication unit configured to relay transmission and reception data to and from a mobile station by using a backhaul link connected to one of at least one base station and an access link connected to the mobile station; and a control unit configured to control the backhaul link, wherein the control unit acquires a donor cell list indicating at least one candidate cell through the radio communication unit, maintains second cell management information and determines a donor cell, to be connected to the relay station by the backhaul link, from the donor cell list in response to receiving first cell management information relating to the at least one candidate cell from the at least one base station, the first cell management information includes cell configuration information indicating a time-division implementing status of a radio resource of the at least one candidate cell, the second cell management information includes performance information relating to a data transfer capability of the relay station apparatus, when the relay station apparatus possesses a first performance, the control unit determines a cell in which a radio resource time-division is already implemented among the at least one candidate cell as the donor cell, and when the relay station apparatus possesses a second performance with a data transfer capability higher than that of the first performance, the control unit determines a cell in which a radio resource time-division is not yet implemented among the at least one candidate cell as the donor cell.

46. A base station apparatus comprising:

a radio communication unit configured to perform data transfer, through a backhaul link connected to a relay station, with a mobile station connected to the relay station by means of an access link; and a control unit configured to control the backhaul link, wherein the control unit maintains or receives, from another base station apparatus, first cell management information and determines a donor cell, to be connected to the relay station by the backhaul link from the donor cell list in response to receiving second cell management information from the relay station, the first cell management information relates to the at least one candidate cell, the first cell management information includes cell configuration information indicating a time-division implementing status of a radio resource of the at least one candidate cell, the second cell management information includes performance information relating to a data transfer capability of the relay station apparatus, when the relay station apparatus possesses a first performance, the control unit determines a cell in which a radio resource time-division is already implemented among the at least one candidate cell as the donor cell, and when the relay station apparatus possesses a second performance with a data transfer capability higher than that of the first performance, the control unit determines a cell in which a radio resource time-division is not yet implemented among the at least one candidate cell as the donor cell.

* * * * *